(12) United States Patent
Liu et al.

(10) Patent No.: US 12,497,455 B2
(45) Date of Patent: Dec. 16, 2025

(54) ANTI-CD3E/BCMA BISPECIFIC ANTIBODY AND USE THEREOF

(71) Applicant: CHONGQING GENRIX BIOPHARMACEUTICAL CO., LTD., Chongqing (CN)

(72) Inventors: Zhigang Liu, Beijing (CN); Shunan Wan, Beijing (CN); Yulan Liu, Beijing (CN); Xiaobo Hao, Beijing (CN); Junjie Hu, Beijing (CN); Jingjing Guo, Beijing (CN)

(73) Assignee: CHONGQING GENRIX BIOPHARMACEUTICAL CO., LTD., Chongqing (CN)

( * ) Notice: Subject to any disclaimer, the term of this patent is extended or adjusted under 35 U.S.C. 154(b) by 987 days.

(21) Appl. No.: 17/620,290

(22) PCT Filed: Aug. 27, 2019

(86) PCT No.: PCT/CN2019/102817
§ 371 (c)(1),
(2) Date: Dec. 17, 2021

(87) PCT Pub. No.: WO2020/252907
PCT Pub. Date: Dec. 24, 2020

(65) Prior Publication Data
US 2023/0212287 A1 Jul. 6, 2023

(30) Foreign Application Priority Data
Jun. 19, 2019 (CN) .......................... 201910532734.7

(51) Int. Cl.
*C07K 16/28* (2006.01)
*A61P 35/00* (2006.01)

(52) U.S. Cl.
CPC .......... *C07K 16/2809* (2013.01); *A61P 35/00* (2018.01); *C07K 16/2878* (2013.01); *C07K 2317/31* (2013.01); *C07K 2317/55* (2013.01); *C07K 2317/565* (2013.01); *C07K 2317/622* (2013.01)

(58) Field of Classification Search
None
See application file for complete search history.

(56) References Cited

U.S. PATENT DOCUMENTS

| 9,273,141 | B2 | 3/2016 | Algate |
|---|---|---|---|
| 10,253,104 | B2 | 4/2019 | Vu et al. |
| 2013/0058936 | A1 | 3/2013 | Bruenker et al. |
| 2013/0156769 | A1 | 6/2013 | Kufer et al. |
| 2017/0051068 | A1 | 2/2017 | Pillarisetti et al. |
| 2017/0327571 | A1 | 11/2017 | Liu |
| 2017/0327579 | A1 | 11/2017 | Vu |
| 2018/0022807 | A1 | 1/2018 | Kasturirangan |
| 2020/0062853 | A1 | 2/2020 | Altintas |

FOREIGN PATENT DOCUMENTS

| CN | 105315371 A | 2/2016 | |
|---|---|---|---|
| CN | 106831995 A | 6/2017 | |
| CN | 106831996 A | 6/2017 | |
| CN | 107428839 A | 12/2017 | |
| CN | 109152835 A | 1/2019 | |
| CN | 109641959 A | 4/2019 | |
| CN | 110172100 A | 8/2019 | |
| CN | 110229232 A | 9/2019 | |
| CN | 110229232 B | 5/2020 | |
| EA | 28162 B1 | 10/2017 | |
| EP | 2982692 A1 | 2/2016 | |
| RU | 2605390 C2 | 12/2016 | |
| WO | 2013026839 A1 | 2/2013 | |
| WO | 2016079081 A1 | 5/2016 | |
| WO | WO-2016079177 A1 * | 5/2016 | ......... C07K 16/2809 |
| WO | WO 2016/087531 A1 | 6/2016 | |
| WO | 2017021450 A1 | 2/2017 | |
| WO | WO 2018/176992 A1 | 10/2018 | |

OTHER PUBLICATIONS

NIH-NCI, Cancer Prevention Overview, 2023 (Year: 2023).*
Mayo Clinic, Cancer Treatment, 2024 (Year: 2024).*
NCFR, Cancer Intervention vs Prevention: What does it Mean?, 2024 (Year: 2024).*
Mengshang, et al, J Immunotherapy, 2022, 45, 78-88 (Year: 2022).*
Letouze, et al, Blood Adv, 2024, 8, 2952-2959 (Year: 2024).*
International Search Report and Written Opinion of International Searching Authority for International Application No. PCT/CN2019/102817, with English translations, mailed Mar. 19, 2020 (22 pages).
Seckinger, A. et al.; "Target Expression, Generation, Preclinical Activity, and Pharmacokinetics of the BCMA-T Cell Bispecific Antibody EM801 for Multiple Myeloma Treatment"; Cancer Cell, vol. 31, pp. 396-410; Mar. 2, 2017 (16 pages).
Gavriatopoulou, M. et al.; "Anti-BCMA antibodies in the future management of multiple myeloma"; Expert Review of Anticancer Therapy, pp. 1-20; Feb. 27, 2019 (9 pages).
Hongyan Liu et al.; "Fc Engineering for Developing Therapeutic Bispecific Antibodies and Novel Scaffolds"; Frontiers in Immunology, vol. 8, Article 38, pp. 1-15; Jan. 2017 DOI: 10.3389/fimmu.2017.00038 (15 pages).
Al-Lazikani, B. et al.; "Standard Conformations for the Canonical Structures of Immunoglobulins"; J. Mol. Biol., vol. 273, pp. 927-948; Aug. 1997 (22 pages).

(Continued)

*Primary Examiner* — Michael Szperka
*Assistant Examiner* — Samantha Lake Hopkins
(74) *Attorney, Agent, or Firm* — Lathrop GPM LLP; Malaika O.D. Tyson

(57) ABSTRACT

A bispecific antibody, which comprises an antigen-binding portion against human CD3E and/or an antigen-binding portion against human BCMA. Additionally, provided are medical and biological uses of the bispecific antibody.

13 Claims, 5 Drawing Sheets
Specification includes a Sequence Listing.

(56) References Cited

OTHER PUBLICATIONS

Martin, A. et al.; "Modeling antibody hypervariable loops: A combined algorithm"; Proc. Natl. Acad. Sci. USA, vol. 86, pp. 9268-9272; Dec. 1989.
Coquery, C. et al.; "Regulatory Roles of the Tumor Necrosis Factor Receptor BCMA"; Crit. Rev. Immunol., vol. 32, No. 4, pp. 287-305; 2012 (19 pages).
Shih-Feng Cho et al.; "Targeting B Cell Maturation Antigen (BCMA) in Multiple Myeloma: Potential Uses of BCMA-Based Immunotherapy"; Frontiers in Immunology, vol. 9, Article 1821, pp. 1-15; Aug. 10, 2018; DOI: 10.3389/fimmu.2018.01821 (15 pages).
Merchant, A. M. et al.; "An efficient route to human bispecific IgG"; Nature Biotechnology, vol. 16, pp. 677-681; Jun. 4, 1998 (5 pages).
Canfield, S. et al.; "The Binding Affinity of Human IgG for its High Affinity Fc Receptor is Determined by Multiple Amino Acids in the $C_H2$ Domain and Is Modulated by the Hinge Region"; J. Exp. Med., vol. 173, pp. 1483-1491; The Rockefeller University Press; Jun. 1991; 0022-1007/91/06/1483/09 (9 pages).
Kabat, E. et al.; "Sequences of Proteins of Immunological Interest"; vol. I, Fifth Edition; U.S. Department of Health and Human Services, National Institutes of Health, Bethesda, Md.; 1991 (1251 pages).
European Patent Office; Extended European Search Report in related European Patent Application No. 1993,4266.8 dated Jul. 11, 2023 (15 pages).
Mandikian, D. et al.; "Relative Target Affinities of T-Cell-Dependent Bispecific Antibodies Determine Biodistribution in a Solid Tumor Mouse Model"; Molecular Cancer Therapeutics, vol. 17, No. 4, pp. 776-785; Jan. 16, 2018; XP055538955; US ISSN: 1535-7163; DOI: 10.1158/1535-7163.MCT-17-0657 (11 pages).
Zuch de Zafra, C. et al.; "Targeting Multiple Myeloma with AMG 424, a Novel Anti-CD38/CD3 Bispecific T-cell-recruiting Antibody Optimized for Cytotoxicity and Cytokine Release"; Clinical Cancer Research, vol. 25, No. 13, pp. 3921-3933; Mar. 27, 2019; XP055645684; US ISSN: 1078-0432; DOI: 10.1158/1078-0432.CCR-18-2752 (14 pages).
Van Blarcom, T. et al.; "Productive common light chain libraries yield diverse panels of high affinity bispecific antibodies"; mAbs, vol. 10, No. 2, pp. 256-268; Feb. 17, 2018; XP093053006; US ISSN: 1942-0862; DOI: 10.1080/19420862.2017.1406570 (14 pages).
Hirotake Shiraiwa et al.; "Engineering a bispecific antibody with a common light chain: Identification and optimization of an anti-CD3 epsilon and anti-GPC3 bispecific antibody, ERY974"; Methods, vol. 154, pp. 10-20; Feb. 1, 2019; XP055715064; NL ISSN: 1046-2023; DOI: 10.1016/j.ymeth.2018.10.005 (11 pages).
Roitt, I. et al.; selection from Immunology, Fifth Edition, Moskva, Mir., pp. 110-111; C.V. Mosby Co., copyright 1998, in Russian with English-language summary; ISBN10: 0723429189 (5 pages).
Singer, M. et al.; "Genes & Genomes: A Changing Perspective"; Moskva, "Mir", v. 1, pp. 63-64; copyright 1998; in Russian with English-language summary (5 pages).
Office Action in related Russian Patent Application No. 2022100401/10(000718), dated Jan. 23, 2023, in Russian, with English translation (17 pages).
Acceptance Decision in related Russian Patent Application No. 2022100401/10(000718), dated Jun. 1, 2023, in Russian with English translation (11 pages).
Muller, S. et al.; "Spliceosomal Peptide P140 for Immunotherapy of Systemic Lupus Erythematosus: Results of an Early Phase II Clinical Trial"; Arthritis & Rheumatism, vol. 58, No. 12, pp. 3873-3883; Dec. 2008; DOI 10.1002/art.24027 (11 pages).
Mariuzza, R. A. et al.; "The Structural Basis of Antigen-Antibody Recognition"; Ann. Rev. Biophys. Chem. vol. 16, pp. 139-159; 1987 (21 pages).

\* cited by examiner

ANTI-CD3E/BCMA BISPECIFIC ANTIBODY AND USE THEREOF

CROSS REFERENCE TO RELATED APPLICATION

The present application is a U.S. National Stage of International Application Patent No. PCT/CN2019/102817, filed on Aug. 27, 2019, which claims the benefit of and priority to Chinese Patent Application No. 201910532734.7, filed on Jun. 19, 2019, both of which are incorporated herein by reference in their respective entireties.

SEQUENCE LISTING

The instant application contains a Sequence Listing which has been submitted in ASCII format via EFS-Web and is hereby incorporated by reference in its entirety. Said ASCII copy, created on Dec. 28, 2021, is named 078291-000272USPX_SL.txt and is 37,513 bytes in size.

TECHNICAL FIELD

The present application generally relates to the field of antibody drugs. In particular, the present application relates to a bispecific antibody comprising an antigen-binding portion against human CD3E and/or an antigen-binding portion against human BCMA and medical and biological uses thereof.

BACKGROUND

Bispecific antibody (BsAb) is a type of artificial antibody that comprises two different antigen binding sites. Bispecific antibodies are widely used in the field of biomedicine, especially tumor immunotherapy. One arm of the bispecific antibodies targeting CD3 can bind to the CD3E subunit in TCR receptor complex on the surface of T cells to provide a first signal to activate T cells, and the other arm targets tumor antigen. Bispecific antibodies can bring tumor cells and T cells closer together, and directly kill tumor cells while activating T cells.

There are numerous platforms for bispecific antibodies and their structures are complex. In terms of antibody structures, bispecific antibodies can be divided into two categories: those with Fc segments and those without Fc segments. The bispecific antibodies without Fc segments consist of the VH and VL regions or Fab fragments from two antibodies. The main representatives of such bispecific antibodies are BiTE, DART, TandAbs, bi-nanobody, and the like. The advantage of such bispecific antibodies is that there is no mismatch between heavy and light chains, and the disadvantage is that the half-life is short and the clinical application is inconvenient. The bispecific antibodies with Fc segments retain the structures of conventional monoclonal antibodies and can mediate the biological function of the Fc segments. The representatives of such bispecific antibodies are KIH IgG, crossmab, DVD-Ig, Triomab, and the like, which have a long half-life in vivo and can have ADCC and CDC activities (Hongyan Liu, Abhishek Saxena, Sachdev S. Sidhu, et al., Fc engineering for Developing Therapeutic Bispecific Antibodies and Novel Scaffolds. *Front. Immunol.* 2017; 8: 38).

Therefore, in view of the wide applicability of bispecific antibodies, there is a need to develop new bispecific antibodies in the art.

SUMMARY OF THE INVENTION

In a first aspect, there is provided in the present application a bispecific antibody comprising an antigen-binding portion against human CD3E, wherein the antigen-binding portion against human CD3E comprises;
  HCDR1 (heavy chain CDR1) as set forth in SEQ ID NO:1,
  HCDR2 (heavy chain CDR2) as set forth in SEQ ID NO:2,
  HCDR3 (heavy chain CDR3) as set forth in SEQ ID NO:3,
  LCDR1 (light chain CDR1) as set forth in SEQ ID NO:4,
  LCDR2 (light chain CDR2) as set forth in SEQ ID NO:5, and
  LCDR3 (light chain CDR3) as set forth in SEQ ID NO:6;
  wherein HCDRs and LCDRs are defined according to Kabat.

In a second aspect, there is provided in the present application a bispecific antibody comprising an antigen-binding portion against human BCMA, wherein the antigen-binding portion against human BCMA comprises:
  HCDR1 (heavy chain CDR1) as set forth in SEQ ID NO:7,
  HCDR2 (heavy chain CDR2) as set forth in SEQ ID NO:8,
  HCDR3 (heavy chain CDR3) as set forth in SEQ ID NO:9,
  LCDR1 (light chain CDR1) as set forth in SEQ ID NO:4,
  LCDR2 (light chain CDR2) as set forth in SEQ ID NO:5, and
  LCDR3 (light chain CDR3) as set forth in SEQ ID NO:6;
  wherein HCDRs and LCDRs are defined according to Kabat.

In a third aspect, there is provided in the present application a bispecific antibody comprising an antigen-binding portion against human CD3E and an antigen-binding portion against human BCMA.

In some embodiments of the third aspect, the antigen-binding portion against human CD3E comprises:
  HCDR1 as set forth in SEQ ID NO:1,
  HCDR2 as set forth in SEQ ID NO:2,
  HCDR3 as set forth in SEQ ID NO:3,
  LCDR1 as set forth in SEQ ID NO:4,
  LCDR2 as set forth in SEQ ID NO:5, and
  LCDR3 as set forth in SEQ ID NO:6;
  wherein HCDRs and LCDRs are defined according to Kabat.

In some embodiments of the third aspect, the antigen-binding portion against human BCMA comprises:
  HCDR1 as set forth in SEQ ID NO:7,
  HCDR2 as set forth in SEQ ID NO:8,
  HCDR3 as set forth in SEQ ID NO:9,
  LCDR1 as set forth in SEQ ID NO:4,
  LCDR2 as set forth in SEQ ID NO:5, and
  LCDR3 as set forth in SEQ ID NO:6;
  wherein HCDRs and LCDRs are defined according to Kabat.

In some embodiments of the third aspect, the antigen-binding portion against human CD3E and the antigen-binding portion against human BCMA comprise the same light chain variable region.

In some embodiments of the third aspect, the bispecific antibody is an IgG1 antibody comprising two heavy chain constant regions having the same hinge region, and the amino acid sequence of the hinge region is shown in SEQ ID NO:15.

In some embodiments of the third aspect, the bispecific antibody is an IgG1 antibody comprising a first heavy chain constant region and a second heavy chain constant region, wherein the amino acids at positions 354 and 366 of the first heavy chain constant region are C and W, respectively, and the amino acids at positions 349, 366, 368 and 407 of the second heavy chain constant region are C, S, A and V, respectively, the amino acid position of the antibody constant region is determined according to EU numbering.

In some embodiments of the third aspect, the bispecific antibody is an IgG1 antibody comprising a first heavy chain constant region and a second heavy chain constant region, wherein the amino acids at positions 234, 235 and 331 of the first and second heavy chain constant regions are F, E, and S, respectively; the amino acid position of the antibody constant region is determined according to EU numbering.

In some embodiments of the first and third aspects, the antigen-binding portion against human CD3E comprises a heavy chain variable region as set forth in SEQ ID NO:12 and a light chain variable region as set forth in SEQ ID NO:14.

In some embodiments of the second and third aspects, the antigen-binding portion against human BCMA comprises a heavy chain variable region as set forth in SEQ ID NO:10 and a light chain variable region as set forth in SEQ ID NO:14.

In some embodiments of any of the above aspects, the antigen-binding portion against human CD3E comprises a single chain antibody (scFv) or a Fab fragment.

In some embodiments of any of the above aspects, the antigen-binding portion against human BCMA comprises a single chain antibody (scFv) or a Fab fragment.

In some embodiments of the third aspect, the antibody has a first arm and a second arm, wherein the first arm comprises an antigen-binding portion against human CD3E and the second arm comprises an antigen-binding portion against human BCMA:

the first arm comprises the amino acid sequence of the heavy chain variable region as set forth in SEQ ID NO:12, the amino acid sequence of the heavy chain constant region as set forth in SEQ ID NO:19, the amino acid sequence of the light chain variable region as set forth in SEQ ID NO:14, and the amino acid sequence of the light chain constant region as set forth in SEQ ID NO:20;

the second arm comprises the amino acid sequence of the heavy chain variable region as set forth in SEQ ID NO:10, the amino acid sequence of the heavy chain constant region as set forth in SEQ ID NO:18, the amino acid sequence of the light chain variable region as set forth in SEQ ID NO:14, and the amino acid sequence of the light chain constant region as set forth in SEQ ID NO:20.

In a fourth aspect, there is provided in the present application a pharmaceutical composition comprising the bispecific antibody of any one of the first to third aspects.

In a fifth aspect, there is provided in the present application use of the bispecific antibody of any one of the first to third aspects or the pharmaceutical composition of the fourth aspect in the manufacture of a medicament for the prevention or treatment of multiple myeloma.

In a sixth aspect, there is provided in the present application a method of preventing or treating multiple myeloma, comprising administering the bispecific antibody of any one of the first to third aspects or the pharmaceutical composition of the fourth aspect to a subject in need thereof.

SEQUENCE DESCRIPTION

Figure 1:
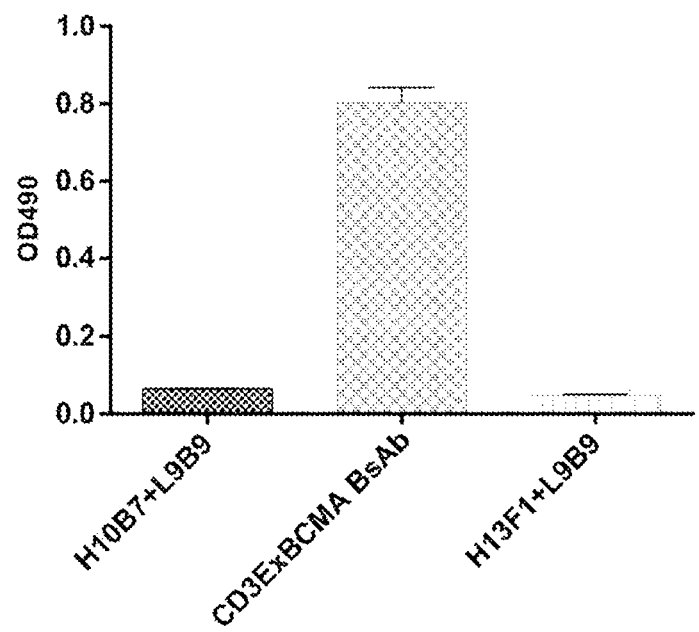
FIG. 1 shows the results of detecting the simultaneous binding of the bispecific antibody CD3ExBCMA to both CD3E and BCMA antigens by using the ELISA method.

SEQ ID NO:1 shows the amino acid sequence of HCDR1 of the heavy chain variable region H10B7 of the anti-human CD3E monoclonal antibody H10B7+L1G10.

SEQ ID NO:2 shows the amino acid sequence of HCDR2 of the heavy chain variable region H10B7 of the anti-human CD3E monoclonal antibody H10B7+L1G10.

SEQ ID NO:3 shows the amino acid sequence of HCDR3 of the heavy chain variable region H10B7 of the anti-human CD3E monoclonal antibody H10B7+L1G10.

SEQ ID NO:4 shows the amino acid sequence of LCDR1 of the light chain variable region L9B9.

SEQ ID NO:5 shows the amino acid sequence of LCDR2 of the light chain variable region L9B9.

SEQ ID NO:6 shows the amino acid sequence of LCDR3 of the light chain variable region L9B9.

SEQ ID NO:7 shows the amino acid sequence of HCDR1 of the heavy chain variable region mutant H13F1 of the anti-human BCMA monoclonal antibody C4.

SEQ ID NO:8 shows the amino acid sequence of HCDR2 of the heavy chain variable region mutant H13F1 of the anti-human BCMA monoclonal antibody C4.

SEQ ID NO:9 shows the amino acid sequence of HCDR3 of the heavy chain variable region mutant H13F1 of the anti-human BCMA monoclonal antibody C4.

SEQ ID NO:10 shows the amino acid sequence of the heavy chain variable region mutant H13F1 of the anti-human BCMA monoclonal antibody C4.

SEQ ID NO:11 shows the amino acid sequence of the heavy chain variable region C4VH of the anti-human BCMA monoclonal antibody C4.

SEQ ID NO:12 shows the amino acid sequence of the heavy chain variable region H10B7 of the anti-human CD3E monoclonal antibody H10B7+L1G10.

SEQ ID NO:13 shows the amino acid sequence of the light chain variable region L1G10 of the anti-human CD3E monoclonal antibody H10B7+L1G10.

SEQ ID NO:14 shows the amino acid sequence of the light chain variable region L9B9.

SEQ ID NO:15 shows the amino acid sequence of the hinge region.

SEQ ID NO:16 shows the amino acid sequence of the light chain variable region C4VK of the anti-human BCMA monoclonal antibody C4.

SEQ ID NO:17 shows the amino acid sequence of the heavy chain constant region mutant IgG1K of human IgG1 subtype antibody.

SEQ ID NO:18 shows the amino acid sequence of the heavy chain constant region mutant IgG1m3-H of human IgG1 subtype antibody.

SEQ ID NO:19 shows the amino acid sequence of the heavy chain constant region mutant IgG1m3-K of human IgG1 subtype antibody.

SEQ ID NO:20 shows the amino acid sequence of the light chain constant region of human kappa (κ) subtype.

SEQ ID NO:21 shows the amino acid sequence of the light chain constant region of human lambda (λ) subtype.

SEQ ID NO:22 shows the amino acid sequence of the extracellular region of human CD3E.

SEQ ID NO:23 shows the amino acid sequence of the extracellular region of human CD3D.

SEQ ID NO:24 shows the amino acid sequence of the extracellular region of monkey CD3E.

SEQ ID NO:25 shows the amino acid sequence of the extracellular region of monkey CD3D.

SEQ ID NO:26 shows the amino acid sequence of the extracellular region of mouse CD3E.

SEQ ID NO:27 shows the amino acid sequence of the extracellular region of mouse CD3D.

SEQ ID NO:28 shows the amino acid sequence of the extracellular region of human BCMA.

SEQ ID NO:29 shows the amino acid sequence of the extracellular region of monkey BCMA.

SEQ ID NO:30 shows the amino acid sequence of the extracellular region of mouse BCMA.

SEQ ID NO:31 shows the amino acid sequence of His tag.

SEQ ID NO:32 shows the amino acid sequence of Fc segment of mouse antibody IgG2a (mFc).

SEQ ID NO:33 shows the amino acid sequence of the Fc mutant FcK of human IgG1 subtype of heterodimer.

SEQ ID NO:34 shows the amino acid sequence of the Fc mutant FcH of human IgG1 subtype of heterodimer.

SEQ ID NO: 35 shows the amino acid sequence of the heavy chain constant region of human IgG1 subtype antibody.

SEQ ID NO:36 shows the amino acid sequence of the heavy chain constant region mutant IgG1H of human IgG1 subtype antibody.

DETAILED DESCRIPTION OF THE INVENTION

Definitions

The following definitions and methods are provided to better define the present application and guide those of ordinary skill in the art in the practice of the present application. Unless otherwise indicated, the terms used in the present application have the meanings commonly understood by those skilled in the art. All patent documents, academic papers, and other publications cited herein are incorporated by reference in their entirety.

When describing the structure of the antibody herein, reference is made to the EU numbering definition of human IgG1 antibody with respect to the description on amino acid position numbering, which is well known and readily available to those skilled in the art. Furthermore, where a mutation is described herein in connection with the EU numbering position, it refers to a mutation produced relative to the native antibody sequence.

As used herein, the term "Fc fragment", "Fc domain", "Fc portion" or the like refers to a portion of the heavy chain constant region of an antibody, including the hinge region, the CH2 segment and the CH3 segment of the constant region. With reference to the EU numbering definition of the human IgG1 antibody, the Fc fragment refers to the amino acid sequence at positions 216-447 in the constant region of the antibody.

As used herein, the term "Fab (fragment antigen-binding) fragment", "Fab portion", or the like refers to an antibody fragment capable of binding to an antigen that are produced after treatment of an intact antibody with papain, including the intact light chain (VL-CL), the heavy chain variable region, and the CHI fragment (VH-CH1).

As used herein, the term "single chain fragment variable (scFv)" refers to an antibody of a single chain structure comprising a polypeptide chain comprising a heavy chain variable region (VH) and a light chain variable region (VL), which is generally constructed using genetic engineering techniques. A flexible linker is typically designed between the heavy chain variable region and the light chain variable region so that the heavy chain variable region and the light chain variable region can be folded into the correct conformation capable of binding to an antigen.

As used herein, the term "antigen-binding portion" refers to a portion of the antibody structure that determines the antigen-binding ability. It will be appreciated by those skilled in the art that the major parts of the antibody structure that determines the antigen-binding ability are the CDRs, so the CDRs are also the core components of the antigen-binding portion. In the construction of a bispecific antibody, the examples of the "antigen-binding portion" include, but are not limited to, a single chain antibody (scFv) or a Fab fragment.

As used herein, the term "bispecific antibody" refers to an antibody having the ability to bind to two different antigens, which may consist of two Fc fragments and two antigen-binding portions fused thereto, respectively.

In some embodiments, "bispecific antibody" used herein refers to a bispecific antibody based on human IgG1 antibody, and in addition to the altered structures described herein, it has the basic characteristics and function of human IgG1 antibody. It is well-known to those skilled in the art that "bispecific antibody" used herein may also be a bispecific antibody based on other immunoglobulin subtype, such as human IgG2 antibody.

It is well known to those skilled in the art that complementarity determining regions (CDRs, usually including CDR1, CDR2 and CDR3) are the regions of a variable region that have mostly impact on the affinity and specificity of an antibody. The CDR sequences of a VH or VL have two common definitions. i.e., the Kabat definition and the Chothia definition (see, e.g., Kabat, "Sequences of Proteins of Immunological Interest", National Institutes of Health, Bethesda, Md. (1991); Al-Lazikani et al., *J. Mol. Biol.* 273:927-948 (1997); and Martin et al., *Proc. Natl. Acad Sci. USA*, 86:9268-9272 (1989)). For the variable region sequences of a given antibody, the sequences of CDR regions in the VH and VL can be determined according to the Kabat definition or the Chothia definition. In some embodiments of the present application, CDR sequences are defined according to the Kabat definition.

For the variable region sequences of a given antibody, the sequences of CDR regions in the variable region sequences can be analyzed in a variety of ways, for example, using online software Abysis (abysis.org/).

As used herein, the term "specific binding" refers to a non-random binding reaction between two molecules, e.g., binding of an antibody to an antigen epitope.

CD3 molecule is an important differentiation antigen on T cell membrane and is also a characteristic marker of mature T cells. CD3 molecule consists of four chains of γ, δ, ε and ζ, or five chains of γ, δ, ε, ζ and η (ζ and η are homologous isomers), is composed of three dimers of CD3γε, CD3δε and CD3ζζ (or CD3δη) and expressed on T cell membrane. Three chains of CD3γ, δ and ε contain highly conserved acidic amino acid residues (glutamic acid in γ chain, and aspartic acid in δ and ε chains), which can be non-covalently linked to the basic amino acid residues on the α and β chains of the T cell receptor (TCR) by a salt bridge to form a stable TCR-CD3 complex structure. The complex can transmit T cell activation signals and stabilize the TCR structure. The intracellular domain of each chain of CD3 contains a ITAM (immune receptor tyrosine-based activation motif) structure, which is the basis for CD3 molecule-mediated intracellular signaling. When the TCR specifically recognizes and binds to an antigen (an antigenic peptide presented by an MHC molecule), tyrosine protein kinases within T cells phosphorylate tyrosine residues on ITAM, and recruit tyrosine protein kinases containing SH2 domains (ZAP-70). The signal is transduced into the cytoplasm of T cells to initiate activation mechanism within the cells. Therefore, CD3 has the function of transmitting the activation signal generated after TCR recognizes the antigen and the signal is the first signal for inducing T cell activation.

B cell maturation antigen (BCMA) is the 17$^{th}$ member of the TNF receptor superfamily. As a non-glycosylated type III transmembrane protein receptor, BCMA consists of 184 amino acid residues with 80 amino acid residues in the intracellular region and only one carbohydrate recognition domain in the extracellular region. BCMA is involved in B cell maturation and differentiation as a specific antigen on the surface of plasma cells. BCMA is also involved in long-term survival of plasma cells as an essential substance. BCMA, TACI and BAFFR respectively bind to two ligands, i.e., a proliferation-inducing ligand (APRIL) and B cell activation factor (BAFF), and participate in activation of signal transduction molecules such as p38, Elk and c-Jun via the NFκB pathway, thereby affecting the maturation, growth and survival of B cells. However, BCMA is not critical for B-cell survival. It has been shown that the production of short-term immunoglobulin, the early humoral immune response and the development of B-lymphocyte in mouse plasma cells after BCMA knockout are not affected (Christine M. Coquery, Loren D. Erickson. Regulatory Roles of the Tumor Necrosis Factor Receptor BCMA. *Crit Rev Immunol.* 2012; 32(4): 287-305). The expression of BCMA is selective. It is not expressed in naive B cells, memory B cells, CD34+ hematopoietic cells and other normal tissues, and is selectively induced to be expressed during differentiation of plasma cells, and is mainly expressed on plasma-like dendritic cells and bone marrow plasma cells. Multiple myeloma is a B cell malignant tumor caused by malignant proliferation and canceration of cells. It is mainly manifested by the uncontrolled expansion of plasma cells in the bone marrow and the production of a large number of monoclonal immunoglobulins, which result in a series of symptoms such as bone destruction, elevated blood calcium, anemia, renal damage, immune decline, and the like. The expression level of BCMA in myeloma cells is significantly higher than that in plasma cells and plasmablasts. BCMA is highly and widely expressed throughout the course of plasma cell malignant diseases including monoclonal gammopathy to smoldering myeloma, and further to multiple myeloma (Shih-Feng Cho, Kenneth C. Anderson, Yu-Tzu Tai. Targeting B Cell Maturation Antigen (BCMA) in Multiple Myeloma: Potential Uses of BCMA-Based immunotherapy. *Front. Immunol.*, 2018; 9:1821).

In a first aspect, there is provided in the present application a bispecific antibody comprising an antigen-binding portion against human CD3E, wherein the antigen-binding portion against human CD3E comprises:
HCDR1 as set forth in SEQ ID NO:1,
HCDR2 as set forth in SEQ ID NO:2,
HCDR3 as set forth in SEQ ID NO:3,
LCDR1 as set forth in SEQ ID NO:4,
LCDR2 as set forth in SEQ ID NO:5, and
LCDR3 as set forth in SEQ ID NO:6;
wherein HCDRs and LCDRs are defined according to Kabat.

In a second aspect, there is provided in the present application a bispecific antibody comprising an antigen-binding portion against human BCMA, wherein the antigen-binding portion against human BCMA comprises:
HCDR1 as set forth in SEQ ID NO:7,
HCDR2 as set forth in SEQ ID NO:8,
HCDR3 as set forth in SEQ ID NO:9,
LCDR1 as set forth in SEQ ID NO:4,
LCDR2 as set forth in SEQ ID NO:5, and
LCDR3 as set forth in SEQ ID NO:6;
wherein HCDRs and LCDRs are defined according to Kabat.

In a third aspect, there is provided in the present application a bispecific antibody comprising an antigen-binding portion against human CD3E and an antigen-binding portion against human BCMA.

In some embodiments of the third aspect, the antigen-binding portion against human CD3E comprises:
HCDR1 as set forth in SEQ ID NO:1,
HCDR2 as set forth in SEQ ID NO:2,
HCDR3 as set forth in SEQ ID NO:3,
LCDR1 as set forth in SEQ ID NO:4,
LCDR2 as set forth in SEQ ID NO:5, and
LCDR3 as set forth in SEQ ID NO:6;
wherein HCDRs and LCDRs are defined according to Kabat.

In some embodiments of the third aspect, the antigen-binding portion against human BCMA comprises:
HCDR1 as set forth in SEQ ID NO:7,
HCDR2 as set forth in SEQ ID NO:8, HCDR3 as set forth in SEQ ID NO:9,
LCDR1 as set forth in SEQ ID NO:4,
LCDR2 as set forth in SEQ ID NO:5, and
LCDR3 as set forth in SEQ ID NO:6;
wherein HCDRs and LCDRs are defined according to Kabat.

In some embodiments of the third aspect, the antigen-binding portion against human CD3E and the antigen-binding portion against human BCMA comprise the same light chain variable region.

In some specific embodiments of the third aspect, the antigen-binding portion against human CD3E and the antigen-binding portion against human BCMA comprise the same light chain. This embodiment facilitates proper assembly of the light and heavy chains, and is also a preferred embodiment.

In some embodiments of the third aspect, the bispecific antibody is an IgG1 antibody comprising two heavy chain constant regions having the same hinge region, and the amino acid sequence of the hinge region is shown in SEQ ID NO:15, which replaces the sequences at positions 216-230 of the constant region of the natural human IgG1 antibody; the amino acid position of the antibody constant region is determined according to EU numbering.

In some embodiments of the third aspect, the bispecific antibody is an IgG1 antibody comprising a first heavy chain constant region and a second heavy chain constant region, wherein the amino acids at positions 354 and 366 of the first heavy chain constant region are C and W, respectively, and the amino acids at positions 349, 366, 368 and 407 of the second heavy chain constant region are C, S, A and V, respectively: the amino acid position of the antibody constant region is determined according to EU numbering.

When constructing a bispecific antibody that retains the Fc domain, the structure of the bispecific antibody can be optimized from the following two perspectives: heavy chain heteromerization and proper assembly of the light and heavy chains. In some embodiments, two Fc fragments comprise mutations that can ensure heavy chain heteromerization. The KIH (knob-in-hole) technique is a strategy to address heavy chain heteromerization. Generally, the KIH technique refers to the formation of a structure that facilitates pairing of the heterologous halves to each other by modifying the amino acid sequence of the CH3 region, which can maintain the structure of the normal antibody as much as possible while constituting the bispecific antibody. In some embodiments, the KIH technique utilized includes allowing the amino acids at positions 354 and 366 of one Fc fragment to be C and W, respectively, and the amino acids at positions 349, 366, 368 and 407 of the other Fc fragment to be C, S. A and V, respectively. For guidance on the KIH technique, see, for example, "An efficient route to human bispecific IgG", A. Margaret Merchant et al., Nature Biotechnology. Volume 16, 1998", which is incorporated herein by reference in its entirety.

In some embodiments of the third aspect, the bispecific antibody is an IgG1 antibody comprising a first heavy chain constant region and a second heavy chain constant region, wherein the amino acids at positions 234, 235 and 331 of the first and second heavy chain constant regions are F, E, and S, respectively; the amino acid position of the antibody constant region is determined according to EU numbering.

In some embodiments of the third aspect, the amino acids at positions 234, 235 and 331 of the CH2 fragment of the two heavy chain constant regions are F, E and S, respectively, which can reduce antibody dependent cytotoxicity (ADCC) mediated by the Fc segment of an antibody, thereby potentially reducing side effects caused by bispecific antibody in vivo. For guidance on the above mutations, see, for example, "The binding affinity of human IgG for its high affinity Fc receptor is determined by multiple amino acids in the CH2 domain and is modulated by the hinge region". Stephen M. Canfield et al., *J. Exp. Med.* Volume 173, 1991, which is incorporated herein by reference in its entirety.

In some embodiments of the first and third aspects, the antigen-binding portion against human CD3E comprises a heavy chain variable region as set forth in SEQ ID NO:12 (comprising HCDR1 as set forth in SEQ ID NO:1, HCDR2 as set forth in SEQ ID NO:2, and HCDR3 as set forth in SEQ ID NO:3) and a light chain variable region as set forth in SEQ ID NO:14 (comprising LCDR1 as set forth in SEQ ID NO:4, LCDR2 as set forth in SEQ ID NO:5, and LCDR3 as set forth in SEQ ID NO:6).

In some embodiments of the second and third aspects, the antigen-binding portion against human BCMA comprises a heavy chain variable region as set forth in SEQ ID NO:10 (comprising HCDR1 as set forth in SEQ ID NO:7, HCDR2 as set forth in SEQ ID NO:8, and HCDR3 as set forth in SEQ ID NO:9) and a light chain variable region as set forth in SEQ ID NO:14 (comprising LCDR1 as set forth in SEQ ID NO:4, LCDR2 as set forth in SEQ ID NO:5, and LCDR3 as set forth in SEQ ID NO:6).

In some embodiments of any of the above aspects, the antigen-binding portion against human CD3E comprises a single chain antibody (scFv) or a Fab fragment.

In some embodiments of any of the above aspects, the antigen-binding portion against human BCMA comprises a single chain antibody (scFv) or a Fab fragment.

As the bispecific antibody has two different antigen-binding portions against two different antigens, and the antigen-binding portions may comprise two forms of a single chain antibody (scFv) or a Fab fragment. The configuration of antigen-binding portions of the bispecific antibody may have four combinations for given two antigens: Fab+Fab, Fab+scFv, scFv+Fab, and scFv+scFv.

In some specific embodiments of any of the above aspects, the antigen-binding portion against human CD3E comprises a Fab fragment and the antigen-binding portion against human BCMA comprises a Fab fragment.

In some specific embodiments of any of the above aspects, the antigen-binding portion against human CD3E comprises a Fab fragment and the antigen-binding portion against human BCMA comprises a single chain antibody (scFv).

In some specific embodiments of any of the above aspects, the antigen-binding portion against human CD3E comprises a single chain antibody (scFv) and the antigen-binding portion against human BCMA comprises a Fab fragment.

In some specific embodiments of any of the above aspects, the antigen-binding portion against human CD3E comprises a single chain antibody (scFv) and the antigen-binding portion against human BCMA comprises a single chain antibody (scFv).

The bispecific antibody is also described herein as having two "arms". The bispecific antibody can be divided into two arms bounded by the central axis. The arms of the bispecific antibody can consist of an Fc fragment and an antigen-binding portion (Fab fragment or single chain antibody). For the arm consisting of an Fc fragment and an Fab fragment, its structure is similar to that of a common antibody, comprising intact heavy and light chains, and thus the structure of such an arm can be represented as Fc+Fab, or can be represented as a heavy chain (Fc+the heavy chain variable region of Fab and CH1 fragment)+a light chain (the light chain portion of Fab). When both arms contain the antigen-binding portions in the form of Fab fragment, the structure of the bispecific antibody thus formed is close to that of the native antibody and is a preferred embodiment.

In some embodiments of the third aspect, the antibody has a first arm and a second arm, wherein the first arm comprises an antigen-binding portion against human CD3E and the second arm comprises an antigen-binding portion against human BCMA:

the first arm comprises the amino acid sequence of the heavy chain variable region as set forth in SEQ ID NO:12, the amino acid sequence of the heavy chain constant region as set forth in SEQ ID NO:19, the amino acid sequence of the light chain variable region as set forth in SEQ ID NO:14, and the amino acid sequence of the light chain constant region as set forth in SEQ ID NO:20;

the second arm comprises the amino acid sequence of the heavy chain variable region as set forth in SEQ ID NO:10, the amino acid sequence of the heavy chain constant region as set forth in SEQ ID NO:18, the amino acid sequence of the light chain variable region as set forth in SEQ ID NO:14, and the amino acid sequence of the light chain constant region as set forth in SEQ ID NO:20.

In some embodiments of any of the above aspects, the heavy chain constant region of the bispecific antibody is human IgG1 subtype or various mutants of a selected human IgG1 subtype, such as IgG1H, IgG1K, IgG1m3-H, or IgG1m3-K.

In some embodiments of any of the above aspects, the light chain constant region of the bispecific antibody is human κ subtype or human λ subtype, preferably human κ subtype.

In a fourth aspect, there is provided in the present application a pharmaceutical composition comprising the bispecific antibody of any one of the first to third aspects.

In some embodiments, the pharmaceutical composition further comprises a pharmaceutically acceptable carrier, excipient, diluent, and the like.

In some embodiments, the pharmaceutical composition is used to prevent or treat multiple myeloma.

In some embodiments, the pharmaceutical composition may further comprise a lubricant, such as talc, magnesium stearate, and mineral oil: a wetting agent; an emulsifier: a suspending agent: a preservative such as benzoic acid, sorbic acid and calcium propionate: a sweetening agent and/or a flavoring agent.

In some embodiments, the pharmaceutical composition of the present application may be formulated as a tablet, a pill, a powder, a lozenge, an elixir, a suspension, an emulsion, a solution, a syrup, a suppository, or a capsule.

In some embodiments, the pharmaceutical composition of the present application may be delivered using any physiologically acceptable administration route including, but not limited to, oral administration, parenteral administration, nasal administration, rectal administration, intraperitoneal administration, intravascular injection, subcutaneous administration, transdermal administration, inhalation administration and the like.

In some embodiments, a pharmaceutical composition for therapeutic use may be formulated for storage in a lyophilized formulation or in the form of an aqueous solution by mixing an agent with desired purity with a pharmaceutically acceptable carrier or excipient where appropriate.

In a fifth aspect, there is provided in the present application use of the bispecific antibody of any one of the first to third aspects or the pharmaceutical composition of the fourth aspect in the manufacture of a medicament for the prevention or treatment of multiple myeloma.

In a sixth aspect, there is provided in the present application a method of preventing or treating multiple myeloma, comprising administering the bispecific antibody of any one of the first to third aspects or the pharmaceutical composition of the fourth aspect to a subject in need thereof.

It is to be understood that the foregoing detailed description is intended only to enable those skilled in the art to have better understanding of the present application and is not intended to cause limitations in any way. Various modifications and variations can be made to the described embodiments by those skilled in the art.

The following Examples are for purposes of illustration only and are not intended to limit the scope of the present application.

EXAMPLES

Example 1: Preparation of Recombinant Proteins

Many different recombinant proteins were required in the preparation and identification of CD3ExBCMA bispecific antibody, including the extracellular region of human CD3E (hCD3E, SEQ ID NO: 22), the extracellular region of human CD3D (hCD3D, SEQ ID NO: 23), the extracellular region of monkey CD3E (mfCD3E, SEQ ID NO: 24), the extracellular region of monkey CD3D (mfCD3D, SEQ ID NO: 25), the extracellular region of mouse CD3E (mCD3E, SEQ ID NO: 26), the extracellular region of mouse CD3D (mCD3D, SEQ ID NO: 27) and the extracellular region of human BCMA (hBCMA, SEQ ID NO: 28), the extracellular region of monkey BCMA (mfBCMA, SEQ ID NO: 29), and the extracellular region of mouse BCMA (mBCMA, SEQ ID NO: 30). These recombinant proteins all have a large number of post-translational modifications (e.g., glycosylation or disulfide bonds, etc.), and thus the use of the mammal cell expression system would be more advantageous in maintaining the structures and functions of the recombinant proteins. Furthermore, for ease of purification, His tags (SEQ ID NO: 31) or Fc fragments of mouse antibody IgG2a (mFc, SEQ ID NO: 32) were added to the C-terminus of the non-antibody recombinant proteins, or Fc mutants (FcK, SEQ ID NO: 33 or FcH, SEQ ID NO: 34) of human IgG1 subtype of heterodimer were formed based on KIH (Knob-Into-Hole) technique. In the preparation of recombinant antibody, the heavy chain constant region of the antibody can be human IgG1 subtype (SEQ ID NO: 35) or various mutants of the selected human IgG1 subtype, such as IgG1H (SEQ ID NO: 36), IgG1K (SEQ ID NO: 17), IgG1m3-H (SEQ ID NO: 18) or IgG1m3-K (SEQ ID NO: 19), and the light chain constant region can be human κ subtype (SEQ ID NO: 20) or human λ subtype (SEQ ID NO: 21).

Based on the amino acid sequences of various recombinant proteins of interest recorded in the Uniprot database, the genes (comprising His-tag, mFc or Fc encoding gene) of the above recombinant proteins were designed and synthesized. By conventional molecular biology techniques, the synthesized genes encoding the recombinant proteins were cloned into proper eukaryotic expression vectors (e.g., pcDNA3.1 from Invitrogen Inc.). Then, liposomes (e.g., 293fectin from Invitrogen Inc.) or other transfection agents (e.g., PEI) were used to transfect the recombinant protein expression plasmids as prepared into HEK293 cells (e.g., HEK293F from Invitrogen Inc.). The cells were incubated in suspension under serum-free condition for 3-5 days. Then, the supernatant of the culture was harvested by centrifugation.

For recombinant proteins fused with His-tags, the recombinant proteins in the supernatant were further purified using metal chelate affinity chromatography columns (e.g., His-Trap FF from GE Inc.). The recombinant proteins and antibodies fused with mFc were further purified using a Protein A/G affinity chromatography column (e.g., Mabselect SURE from GE Inc.). Then, the recombinant protein preservation buffer was then replaced with PBS buffer (pH 7.0) or other suitable buffers using a desalination column (e.g., Hitrap desalting, GE Inc.). If necessary, the antibody samples can be sterilized by filtration and then stored in aliquots at −20° C. for later use.

Example 2: Screening and Identification of Common Light Chains 2.1 Screening of Common Light Chains H10B7+L1G10 is a monoclonal antibody that binds to human CD3E obtained by using human antibody library technique. The amino acid sequence of the heavy chain variable region H10B7 of H10B7+L1G10 is shown in SEQ ID NO: 12 and the amino acid sequence of the light chain variable region L1G10 is shown in SEQ ID NO: 13 (see the amino acid sequences as set forth in SEQ ID NO: 19 and SEQ ID NO: 20 in Chinese Patent Application No. 201910372193.6).

C4 is a monoclonal antibody targeting the tumor antigen BCMA, the amino acid sequence of the heavy chain variable region C4VH is shown in SEQ ID NO: 11, and the amino acid sequence of the light chain variable region C4VK is shown in SEQ ID NO: 16 (see the sequence of the monoclonal antibody CA8-J7M0 in U.S. Pat. No. 9,273,141B2).

The functions and properties of the monoclonal antibodies C4 and H10B7+L1G10 have been experimentally confirmed.

Based on the established dual-vector system for the phage display, the original light chain library was subjected to two rounds of screening and enrichment on the basis of the heavy chain variable region H10B7 of the anti-CD3E monoclonal antibody H10B7+L1G10 with CD3E/CD3D as a screening antigen by using the light chain replacement strategy (see Example 4 in Chinese Patent Application No. 201510097117.0 for detailed experimental protocols). Next, the light chain library enriched by CD3E/CD3D was subjected to two rounds of screening and enrichment on the basis of the heavy chain of the anti-BCMA monoclonal antibody C4 with BCMA as the antigen. Finally, the resultant light chain was identified to obtain the common light chain variable region L9B9 (SEQ ID NO: 14), which can simultaneously maintain the activity of both the anti-CD3E antibody and the anti-BCMA antibody.

The heavy chain variable region H10B7, the heavy chain variable region C4VH of C4, and the light chain variable region L9B9 were respectively cloned into eukaryotic expression vectors fused with human IgG1 heavy chain constant region and the κ light chain constant region by using conventional molecular biological means, so as to express complete antibodies H10B7+L9B9 and C4VH+L9B9 in combination.

2.2 Determination of the Binding Affinity of the Anti-BCMA Antibody C4VH+L9B9 with Common Light Chain to Human BCMA The affinity of anti-BCMA antibodies (C4 and C4VH+L9B9) was determined by surface plasmon resonance technique using Biacore X100. Reagents and consumables such as amino coupling kit (BR-1000-50), human antibody capture kit (BR-1008-39), CM5 chip (BR100012), and 10×HBS-EP, pH 7.4 (BR100669) were purchased from GE healthcare. The surface of the carboxylated CM5 chip was activated with 1-ethyl-3-(3-dimethylaminopropyl) carbodiimide hydrochloride (EDC) and N-hydroxysuccinimide (NHS) according to the instructions in the kit. The anti-human IgG (Fc) antibody (capture antibody) was diluted to 25 μg/mL with 10 mM sodium acetate solution (pH 5.0), followed by injection at a flow rate of 10 μL/min to achieve a coupling amount of approximately up to 10,000 response units (RU). After injection of the capture antibody, 1 M ethanolamine was injected to block unreacted groups. For kinetic measurement, the anti-BCMA antibody was diluted to 0.5-1 μg/mL, followed by injection at a flow rate of 10 μL/min to ensure that about 400 RU of the antibody was captured by the anti-human Fc antibody. Next, a series of concentration gradients for hBCMA-his were set (for example, 0.617 nM, 1.85 nM, 5.56 nM, 16.7 nM, and 50 nM), and were injected from low concentration to high concentration at 30 μL/min at 25° C. The association time was 120 s, and the dissociation time was 1800 s. The surface of the chip was regenerated by injection of 3 M $MgCl_2$ solution at 10 μL/min for 30 s. The association rate (Kon) and dissociation rate (Koff) were calculated by fitting the association and dissociation sensorgrams with a 1:1 association model using the Biacore X100 evaluation software, version 2.0.1. The dissociation equilibrium constant (KD) was calculated as the ratio Koff/Kon. The fitting results are shown in Table 1.

TABLE 1

| Affinity constants of binding of anti-BCMA antibodies to human BCMA | | | |
|---|---|---|---|
| | Kon | Koff | KD |
| C4 | 4.333E+5 | 7.948E−5 | 1.834E−10 |
| C4VH + L9B9 | 3.238E+5 | 9.554E−4 | 2.950E−9 |

Example 3: The Affinity Maturation of Ant-BCMA Antibody 3.1 Screening of the Heavy Chain Mutation Library of C4

A CDR3 mutant library based on the heavy chain variable region C4VH was constructed by introducing a mutation in the CDR3 region of the heavy chain variable region C4VH using conventional molecular biological means. The designed mutation scheme is shown in Table 2, and the 1.2×10E8 of library capacity was created with an accuracy of 86.7%.

TABLE 2

| Mutation scheme of CDR3 mutant library based on the heavy chain variable region C4VH of C4 C4VH-CDR3: 1.8 × 10E7 diversity | | |
|---|---|---|
| Initial amino acid | Mutant amino acid | Degenerate code |
| G | G, A or D | GVT |
| A | A, T, N, D, S or G | RVC |
| I | L, F, I or V | NTC |

TABLE 2-continued

Mutation scheme of CDR3 mutant library based on
the heavy chain variable region C4VH of C4
C4VH-CDR3: 1.8 × 10E7 diversity

| Initial amino acid | Mutant amino acid | Degenerate code |
|---|---|---|
| Y | F, S, Y, I, T or N | WHC |
| D | D, Y, S or A | KMC |
| G | G, A or D | GVT |
| Y | F or Y | TWC |
| D | D, E, A or G | GVM |
| V | L, F, I or V | NTC |
| L | L, F, I or V | NTC |
| D | D, N, S, T, A or G | RVC |
| N | N, D, Y, S, A or T | DMC |

Based on the dual-vector system for the phage display (see Example 5 in Chinese Patent Application No. 201510097117.0), the constructed C4VH-CDR3 mutant library was subjected to three rounds of screening and enrichment with the hBCMA-His antigen by solid phase screening method. Finally, the heavy chain variable region mutant H13F1 (SEQ ID NO:10) with increased affinity was obtained.

3.2 Affinity Assay of the Heavy Chain Mutant of C4

The nucleotide sequences encoding the heavy chain variable region mutant H13F1 of C4 and the light chain variable region L9B9 were respectively cloned into eukaryotic expression vectors fused with the nucleotide sequences encoding the human heavy chain constant region and the light chain constant region by using conventional molecular biological means, so as to express complete antibodies in combination. Referring to Example 2.2, the mutant of C4 (IgG1 subtype) was subjected to affinity assay by using Biacore X100, and the result is shown in Table 3.

TABLE 3

Affinity constants of binding of anti-BCMA
antibodies to human BCMA

| | Kon | Koff | KD |
|---|---|---|---|
| C4VH + L9B9 | 5.307E+5 | 8.156E−4 | 1.537E−9 |
| H13F1 + L9B9 | 7.85E+5 | 4.284E−4 | 5.429E−10 |

Example 4: Preparation of Bispecific Antibodies

The nucleotide sequences encoding the heavy chain variable region H10B7 of the anti-CD3E monoclonal antibody and the heavy chain variable region H13F1 of the anti-BCMA monoclonal antibody were respectively cloned into suitable eukaryotic expression vectors to construct heterodimers based on the common light chain. That is, the nucleotide sequence encoding the heavy chain variable region of the anti-CD3E antibody was cloned into eukaryotic expression vectors fused with the nucleotide sequence encoding the IgG1 constant region with Knob mutation IgG1m3-K, the nucleotide sequence encoding the heavy chain variable region of the anti-BCMA antibody was cloned into eukaryotic expression vectors containing the nucleotide sequence encoding the IgG1 constant region with Hole mutation IgG1m3-H, and the nucleotide sequence encoding the variable region VK of the common light chain L9B9 was cloned into eukaryotic expression vectors fused with the nucleotide sequence encoding the human light chain constant region CK.

The three constructed eukaryotic expression vectors expressing H10B7-IgG1m3-K, H13F1-IgG1m3-H and L9B9VK-CK were co-transfected into HEK293F cells using liposomes, and the cells were cultured in suspension in a serum-free medium for 3-5 days. The supernatant of the culture was harvested by centrifugation. The bispecific antibodies in the culture supernatant were purified using a Protein A/G affinity chromatography column (e.g., Mabselect SURE, GE Inc.). The recombinant protein preservation buffer was then replaced with PBS buffer (pH 7.0) or other suitable buffers using a desalination column (e.g., Hitrap desalting, GE Inc.). The desalted protein solution was purified by a size exclusion chromatography (SEC) using Superdex 200 (GE), thereby obtaining the protein of interest. If necessary, the antibody samples can be sterilized by filtration and then stored in aliquots at −20° C. for later use.

Example 5: Affinity Assay of Bispecific Antibodies

Referring to Example 2.2, the affinity assays were performed on anti-BCMA monoclonal antibody H13F1+L9B9, anti-CD3E monoclonal antibody H10B7+L9B9, and bispecific antibody CD3ExBCMA by surface plasmon resonance technique using Biacore X100.

When the affinity of the anti-BCMA monoclonal antibody and the CD3ExBCMA bispecific antibody to the BCMA antigen was determined, the anti-human IgG (Fc) antibody was conjugated to the surface of the CM5 chip. The antibody protein was diluted to 0.5-1 μg/ml, and was injected at 10 μL/min. About 400 RU of the BCMA monoclonal antibody was ensured to be captured by the anti-human Fc antibody, and about 800 RU of the bispecific antibody CD3ExBCMA was ensured to be captured by the anti-human Fc antibody. Next, a series of concentration gradients for BCMA-his were set (for example, 0.617 nM, 1.85 nM, 5.56 nM, 16.7 nM, and 50 nM), and were injected from low concentration to high concentration at 30 μL/min at 25° C. The association time was 120 s, and the dissociation time was 1800 s. The surface of the chip was regenerated by injection of 3 M MgCl$_2$ solution at 10 μL/min for 30 s. The results of affinity fit are shown in Table 4 and Table 5.

TABLE 4

Affinity constants of binding of anti-BCMA
monoclonal antibody H13F1 + L9B9 and the
bispecific antibody CD3 × BCMA to human BCMA

| | Kon | Koff | KD |
|---|---|---|---|
| H13F1 + L9B9 | 1.174E+6 | 4.161E−4 | 3.544E−10 |
| CD3E × BCMA | 1.063E+6 | 3.236E−4 | 3.045E−10 |

TABLE 5

Affinity constants of binding of anti-BCMA
monoclonal antibody H13F1 + L9B9 and the
bispecific antibody CD3 × BCMA to monkey BCMA

| | Kon | Koff | KD |
|---|---|---|---|
| H13F1 + L9B9 | 6.63E+5 | 3.289E−3 | 4.961E−9 |
| CD3E × BCMA | 6.551E+5 | 3.26E−3 | 4.976E−9 |

When the affinity of the anti-CD3E monoclonal antibody and the bispecific antibody CD3ExBCMA to the CD3E antigen was determined, the anti-human Fab antibody (Human Fab Capture Kit, GE, 28-9583-25) was conjugated to the surface of the CM5 chip. The antibody protein was diluted to 0.5-1 µg/ml, and was injected at 10 µL/min. About 70 RU of the anti-CD3E monoclonal antibody was ensured to be captured by the anti-human Fab antibody, and about 150 RU of the bispecific antibody CD3ExBCMA was ensured to be captured by the anti-human Fab antibody. A series of concentration gradients for human CD3E heterodimer CD3E-FcK/CD3D-FcH were set (for example, 12.5 nM, 25 nM, 50 nM, 100 nM, and 200 nM), and were injected from low concentration to high concentration at 30 µL/min at 25° C. The association time was 120 s, and the dissociation time was 600 s. The surface of the chip was regenerated by injection of 10 mM glycine-HCl (pH 2.1) at 10 µL/min for 60 s. The results of affinity fit are shown in Table 6.

TABLE 6

Affinity constants of binding of anti-CD3E monoclonal antibody H10B7 + L9B9 and the bispecific antibody CD3E x BCMA to human CD3E

|  | Kon | Koff | KD |
| --- | --- | --- | --- |
| H10B7 + L9B9 | 1.750E+5 | 3.075E−3 | 1.757E−8 |
| CD3E x BCMA | 1.179E+5 | 2.838E−3 | 2.408E−8 |

Example 6: Identification of the Ability of Bispecific Antibodies to Simultaneously Recognize Both CD3E and BCMA Antigens The ability of the bispecific antibody CD3ExBCMA (CD3ExBCMA BsAb) to simultaneously bind to both CD3E and BCMA antigens was detected using conventional ELISA methods.

A 96-well ELISA plate was coated with CD3E-FcK/CD3D-FcH antigen (3 µg/mL, 100 µL/well), and was coated overnight in a refrigerator at 4° C. After being blocked with blocking solution PBS-0.1% Tween 20-3% milk at 37° C. for 1 hour, the anti-BCMA monoclonal antibody H13F1+L9B9, the anti-CD3E monoclonal antibody H10B7+L9B9 and the bispecific antibody CD3ExBCMA (10 µg/mL, 100 µL/well) were respectively added to the plate in duplicate, and incubated at 37° C. for 1 hour. The ELISA plate was washed with PBS-0.1% Tween 20, followed by addition of BCMA-His antigen (1 µg/mL, 100 µL/well) and incubation at 37° C. for 1 hour. The ELISA plate was washed with PBS-0.1% Tween 20, followed by addition of HRP mouse anti-his IgG (Beijing ComWin Biotech Co., Ltd., cw0285M) and incubation at 37° C. for 1 hour. The ELISA plate was washed with PBS-0.1% Tween 20, and OPD substrate color development solution was added. The color development was terminated with 1 M $H_2SO_4$ after 5-10 minutes. The optical density value at 492 nm/630 nm dual wavelength was measured using a microplate reader. The result of ELISA assay is shown in FIG. 1. The bispecific antibody CD3ExBCMA can simultaneously recognize both CD3E and BCMA antigens.

Figure 2:
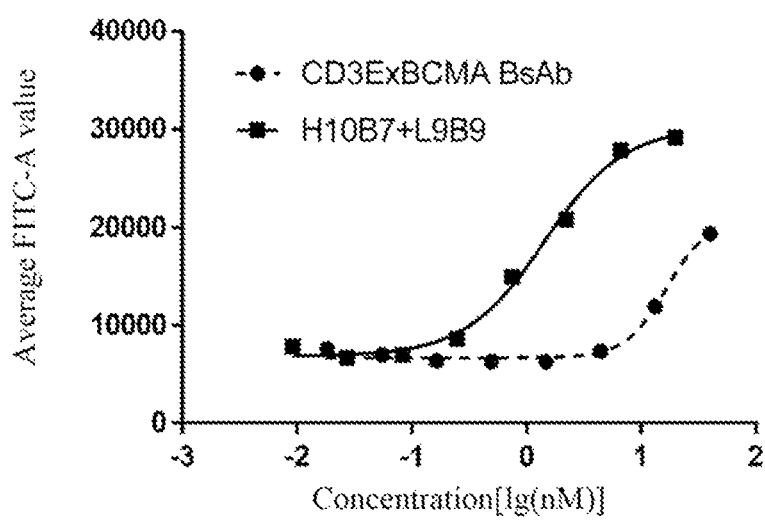
FIG. 2 shows the results of analyzing the binding of the bispecific antibody CD3ExBCMA to CD3E on the surface of Jurkat human acute T lymphocyte leukemia cell by using flow cytometry.

Example 7: Identification of the Ability of Bispecific Antibodies to Recognize CD3E and BCMA on Cell Surfaces Jurkat human acute T-lymphocyte leukemia cells (Cell Resource Center, Institute of Basic Medicine, Chinese Academy of Medical Sciences) in the logarithmic growth phase were harvested, centrifuged, and resuspended in PBS buffer containing 1% BSA to $2\times10^6$ cells/mL, and plated at 100 µL/well in 96-well V bottom plates. The anti-CD3E monoclonal antibody H10B7+L9B9 and the bispecific antibody CD3ExBCMA were taken for gradient dilution. The anti-CD3E monoclonal antibody had an initial concentration of 3 µg/mL, and was diluted by 3-fold gradient, with a total of 8 concentration points. The bispecific antibody had an initial concentration of 6 µg/mL, was diluted by 3-fold gradient, with a total of 8 concentration points. 100 µL of the anti-CD3E monoclonal antibody or 100 µL of the bispecific antibody was added to the wells containing cells and incubated at 4° C. for 1 hour. Next, the cells were washed three times with 200 µL of PBS solution and incubated with goat anti-human IgG-FITC (Beijing Zhongshan Golden Bridge Biotechnology Co., Ltd., ZF-0308) (100 µL/well) at 4° C. for 30 minutes in the dark. Next, the cells were washed three times with 200 µL of PBS solution, and suspended in 100 µL of PBS solution. Thereafter, the FITC channel was detected by flow cytometer (ACEA, Novocyte). The results showed that the bispecific antibody CD3ExBCMA can bind well to CD3 positive Jurkat cells (FIG. 2). The KD value of the bispecific antibody CD3ExBCMA was 16.79 nM, and the KD value of the anti-CD3E monoclonal antibody was 1.43 nM.

Figure 3:
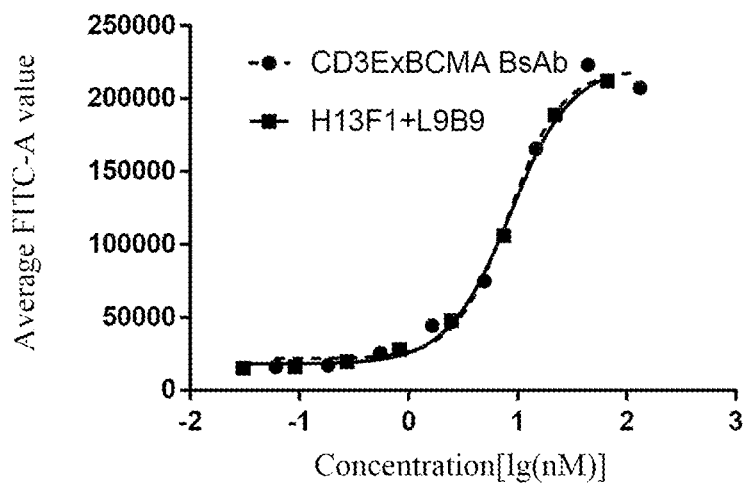
FIG. 3 shows the results of analyzing the binding of the bispecific antibody CD3ExBCMA to BCMA on the surface of NCI-H929 human plasma cell leukemia cell by using flow cytometry.

NCI-H929 human plasma cell leukemia cells (Cell Resource Center, Institute of Basic Medicine, Chinese Academy of Medical Sciences) in logarithmic growth phase were harvested, centrifuged, and resuspended in PBS buffer containing 1% BSA to $2\times10^6$ cells/mL, and plated at 100 µL/well in 96-well V bottom plates. The anti-BCMA monoclonal antibody H13F1+L9B9 and the bispecific antibody CD3ExBCMA were taken for gradient dilution. The anti-BCMA monoclonal antibody had an initial concentration of 10 µg/mL, was diluted by 3-fold gradient, with a total of 8 concentration points. The bispecific antibody had of an initial concentration of 20 µg/mL, was diluted by 3-fold gradient, with a total of 8 concentration points. 100 µL of the anti-BCMA monoclonal antibody or 100 µL of the bispecific antibody was added to the wells containing cells and incubated at 4° C. for 1 hour. Next, the cells were washed three times with 200 µL of PBS solution and incubated with goat anti-human IgG-FITC (Beijing Zhongshan Golden Bridge Biotechnology Co., Ltd., ZF-0308) (100 µL/well) at 4° C. for 30 minutes in the dark. Next, the cells were washed three times with 200 µL of PBS solution, and suspended in 100 µL of PBS solution. Thereafter, the FITC channel was detected by flow cytometer (ACEA, Novocyte). The results showed that the bispecific antibody CD3ExBCMA can bind well to BCMA positive NCI-H929 cells (FIG. 3). The KD value of the bispecific antibody CD3ExBCMA was 8.27 nM, and the KD value of the anti-BCMA monoclonal antibody was 8.47 nM.

Figure 4:
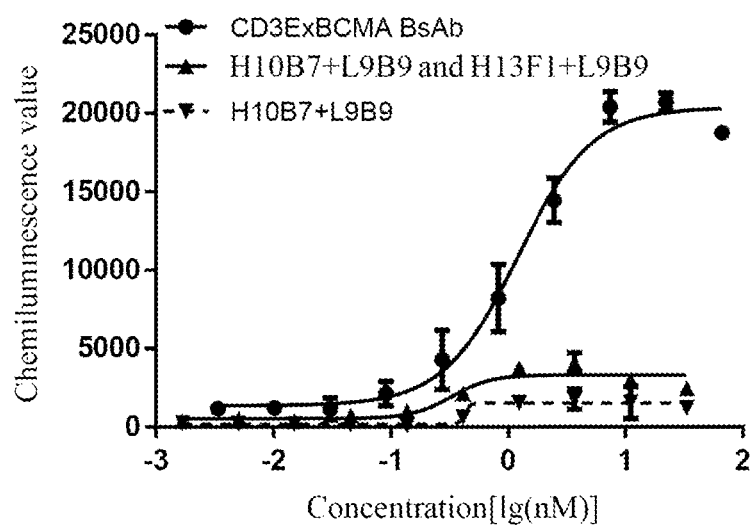
FIG. 4 shows the specific activation of jurkat-dual cells by BCMA-positive tumor cells mediated by the bispecific antibody CD3ExBCMA.

Example 8: Bispecific Antibody Mediates Specific Activation of Jurkat-Dual Cells by BCMA Positive Tumor Cells NCI-H929 human plasma cell leukemia cells (high expression of BCMA, purchased from Cell Resource Center, Institute of Basic Medicine, Chinese Academy of Medical Sciences) in logarithmic growth phase were collected. After centrifugation, the cells were resuspended with 1640 medium to $4\times10^5$ cells/mL and plated in the cell plate at 50 µL/well. Jurkat-dual cells (purchased from Invivogen) in logarithmic growth phase were collected, centrifugated, and resuspended with 1640 medium to $1\times10^6$ cells/mL, and were added to the cell plate with 100 µL/well to obtain a final E:T ratio of 5:1. The bispecific antibody CD3ExBCMA (50

μL/well), the anti-CD3E monoclonal antibody H10B7+ L9B9 (50 μL/well) or a combination of the anti-CD3E monoclonal antibody H10B7+L9B9 and the anti-BCMA monoclonal antibody H13F1+L9B9 was then added to the cell plate, wherein the bispecific antibody had an initial concentration of 10 μg/mL, and was diluted by 3-fold gradient, with a total of 10 concentration point; the anti-CD3E monoclonal antibody H10B7+L9B9 had an initial concentration of 5 μg/mL, and was diluted by 3-fold gradient, with a total of 10 concentration points; and for the combination of the anti-CD3E monoclonal antibody H10B7+L9B9 and the anti-BCMA monoclonal antibody H13F1+L9B9, each of which had an initial concentration of 5 μg/mL, and was diluted by 3-fold gradient, with a total of 10 concentration points. After 20 hours of incubation, the supernatant was taken and the specific activation of Jurkat-Dual cells by BCMA-positive tumor cells mediated by the bispecific antibody CD3ExBCMA, the anti-CD3E monoclonal antibody, and the combination of the anti-CD3E monoclonal antibody and the anti-BCMA monoclonal antibody were detected and analyzed with reference to the instructions of QUANTI-Luc™ (QUANTI-Luc™, Invivogen, rep-qlc2). The results show that only the bispecific antibody CD3ExBCMA can mediate activation of Jurkat-Dual cells by BCMA-positive tumor cells, and neither anti-CD3E monoclonal antibody alone nor the combination of anti-CD3E monoclonal antibody and anti-BCMA monoclonal antibody can mediate activation of Jurkat-Dual cells by BCMA-positive tumor cells (FIG. 4).

Example 9: Bispecific Antibody Mediates the Killing of BCMA Positive Tumor Cells by T Cells 9.1 Isolation of Human Peripheral Blood Mononuclear Cells (PBMCs)

Blood (50 mL each) was collected from normal volunteers. The collected blood was provided by the inventors and their colleagues as volunteers, all of whom had signed informed consent. Inclusion criteria for volunteers were as follow:
1. Age older than 18 years;
2. No HIV and HBV infection;
3. Normal blood routine test;
4. Non-pregnant or non-lactating women.

PBMCs were isolated from whole blood of the volunteers using Ficoll density gradient centrifugation and were cultured in 1640 medium.
9.2 Detection of PBMCs Killing BCMA Positive Tumor Cells Mediated by Bispecific Antibody NCI-H929 human plasma cell leukemia cells (high expression of BCMA), RPMI-8226 human multiple myeloma cells (moderate expression of BCMA), and HL60 human acute promyelocytic leukemia cells (BCMA negative) were purchased from the Cell Resource Center, Institute of Basic Medicine, Chinese Academy of Medical Sciences. The cells in the logarithmic growth phase were collected, centrifuged, and resuspended in 1640 medium to $4 \times 10^5$ cells/mL, and were plated in cell plates at 50 μL/well. Next, the bispecific antibody CD3ExBCMA, which had an initial concentration of 1 μg/mL and was diluted by 4-fold gradient with a total of 10 concentration points, was added (50 μL/well) to the cell plate. Finally, 100 μL/well of PBMCs (effectors) were added to obtain a final E:T ratio of 5:1. Meanwhile, target cell control alone (NCI-H929 cells, RPMI-8226 cells, or HL60 cells), effector cell control alone (PBMCs), and medium blank control alone were set and the volumes thereof were replenished to 200 μL with medium.

After 20 hours of incubation, the supernatant was taken. The killing rate of T cells to tumor cells mediated by the bispecific antibody was detected and analyzed with reference to the instructions of the cytoTox96® Non-Radioactive Cytotoxicity Assay (Promega, G1780).

Figure 5:
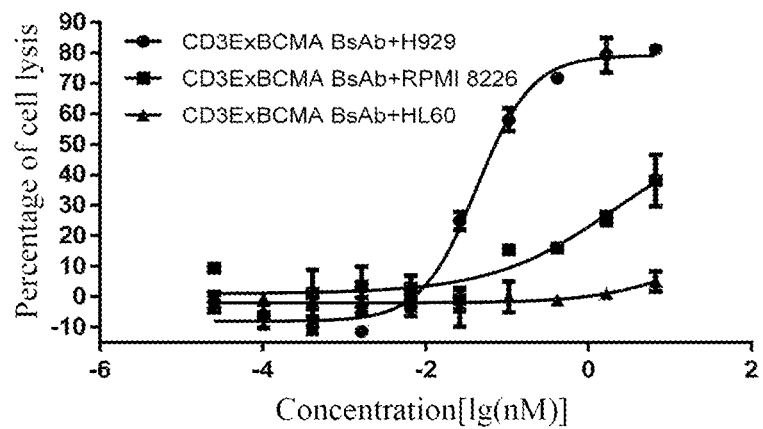
FIG. 5 shows the killing effect of PBMC on BCMA-positive tumor cells mediated by the bispecific antibody CD3ExBCMA.

The results showed that in the presence of the bispecific antibody CD3ExBCMA, the effector cells had a significant killing effect on the highly expressed NCI-H929 cells and the moderately expressed RPMI-8226 cells, but had no killing effect on the negative HL60 (FIG. 5), indicating that the bispecific antibody CD3ExBCMA can effectively mediate the killing of T cells to cells with different positive expression levels of BCMA, and cannot mediate the killing of BCMA negative cells.

Example 10: Bispecific Antibodies can Specifically Stimulate the Expression of Activation Molecule on the Surface of T Cells NCI-H929 human plasma cell leukemia cells (high expression of BCMA), RPMI-8226 human multiple myeloma cells (moderate expression of BCMA), and HL60 human acute promyelocytic leukemia cells (BCMA negative) in logarithmic growth phase were collected, centrifuged, and resuspended in 1640 medium to $4 \times 10^5$ cells/mL, and were plated in cell plates at 50 μL/well. Next, the bispecific antibody CD3ExBCMA, which had an initial concentration of 1 μg/mL and was diluted by 4-fold gradient with a total of 10 concentration points, was added (50 μL/well) to the cell plate. Finally, 100 μL/well of PBMCs (effectors) were added to obtain a final E:T ratio of 5:1. After 20 hours of incubation, the cells were centrifuged at 350 g for 5 minutes, washed once with PBS, and incubated with flow cytometry antibodies, i.e., anti-human CD3 (Ebioscience, 17-0037-42) and anti-human CD69 (Ebioscience, 11-0069-42) at 4° C. for 30 minutes in the dark. Then the cells were washed twice with 200 μL PBS solution, resuspended in 100 μL PBS solution and detected by flow cytometer (ACEA, Novocyte) to compare the difference in the expression of the activation marker CD69 of the CD3 positive cell population after treatment with the bispecific antibody CD3ExBCMA.

Figure 6:
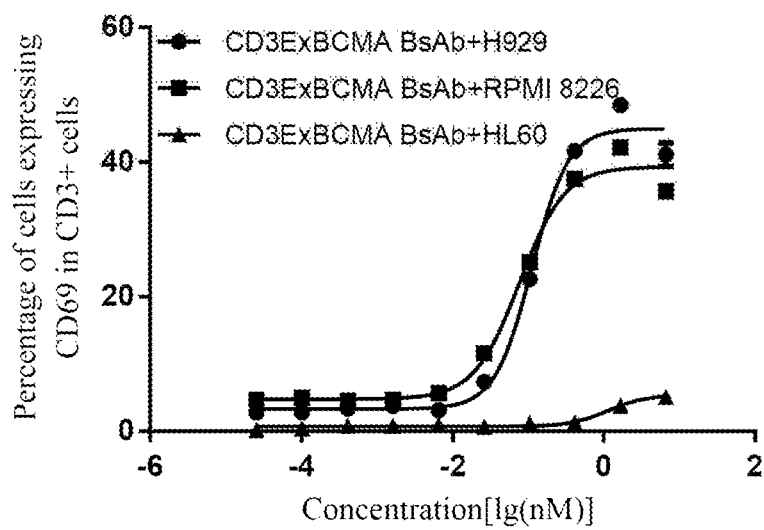
FIG. 6 shows the results of the bispecific antibody CD3ExBCMA stimulating CD69 expression on the surface of T cells in the presence of BCMA-positive tumor cells.

The results showed that the bispecific antibody CD3ExBCMA can specific activate T cells in the presence of NCI-H929 with high expression of BCMA or RPMI-8226 with moderate expression of BCMA, and the bispecific antibody CD3ExBCMA cannot activate T cells in the presence of HL60 with negative BCMA (FIG. 6), indicating that the bispecific antibody CD3ExBCMA can effectively activate T cells in the presence of cells with different positive expression levels of BCMA, and cannot activate T cells in the presence of BCMA negative cells.

Example 11: Antitumor Activity of Bispecific Antibody in PBMC Immune Reconstitution Mouse Model Blood (50 mL each) was collected from normal volunteers. The collected blood was provided by the inventors and their colleagues as volunteers, all of whom had signed informed consent. Inclusion criteria for volunteers were as follow:
1. Age older than 18 years;
2. No HIV and HBV infection;
3. Normal blood routine test;
4. Non-pregnant or non-lactating women.

Human peripheral blood mononuclear cells (PBMCs) were isolated from healthy human peripheral blood using Ficoll density gradient centrifugation. Twenty-five female NPG mice aged 7-8 weeks (Beijing Viktor Biotechnology Co., Ltd.) were selected. $5 \times 10^6$ NCI-H929 cells were subcutaneously inoculated on the right side of NPG mice, and the day of inoculation was defined as day 0. Two hours after tumor cell inoculation, each mouse was inoculated intraperitoneally with $5 \times 10^6$ of individual PBMCs. When the average tumor volume reached to 95 mm³, the mice were randomly divided into three groups according to the tumor sizes. The test groups can be divided into 3 groups: group 2, the bispecific antibody CD3ExBCMA, 0.1 mg/kg; group 3, the bispecific antibody CD3ExBCMA, 0.02 mg/kg; and group 1, the solvent control group. Each group consists of six mice. The bispecific antibody was administered once via tail vein injection. Four days after the first administration, the dose of group 2 was changed to 0.5 mg/kg, the dose of group 3 was changed to 0.1 mg/kg, and the bispecific antibody was administered three more times at the frequency of twice a week. The therapeutic effects were evaluated according to the relative tumor growth inhibition value (TGI), and the safety was evaluated according to the body weight change and death of animals.

Figure 7:
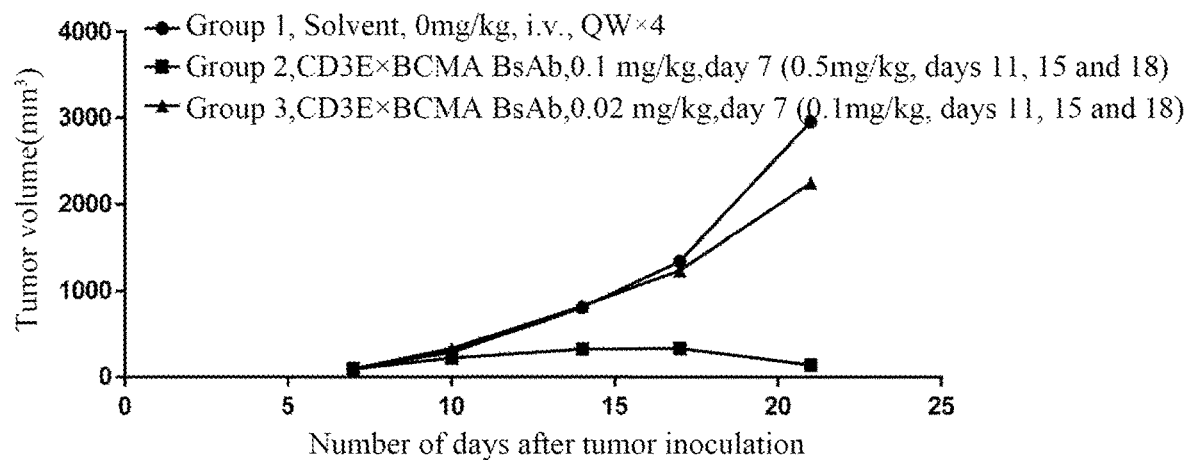
FIG. 7 shows the changes in tumor volume of a PBMC humanized mouse model with NCI-H929 human-derived myeloma treated with the bispecific antibody CD3ExBCMA.
Figure 8:
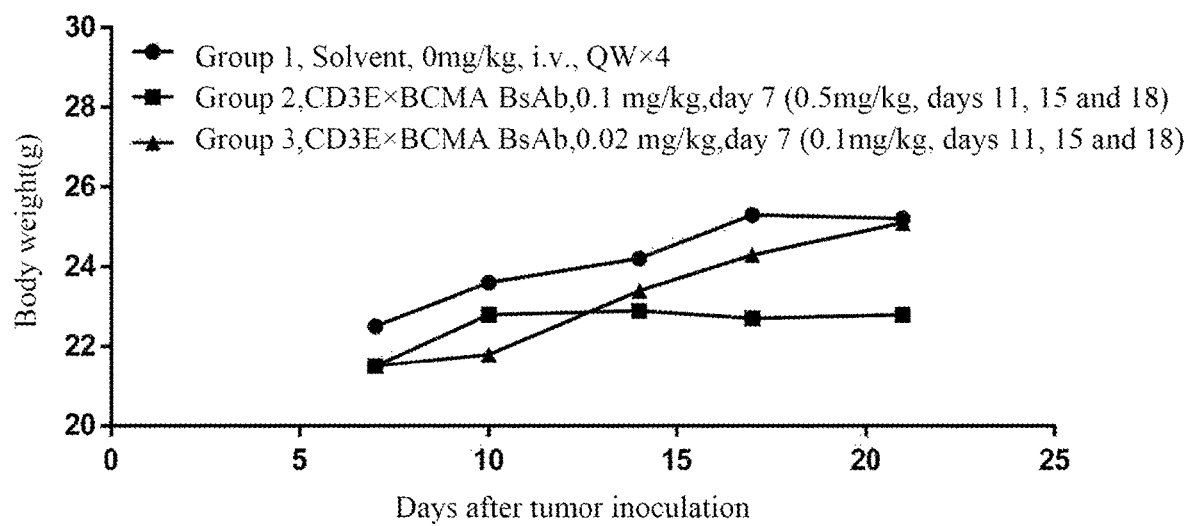
FIG. 8 shows the changes in body weight of a PBMC humanized mouse model with NCI-H929 human-derived myeloma treated with the bispecific antibody CD3ExBCMA.

The results showed that the bispecific antibody CD3ExBCMA significantly inhibited tumor growth at a dose of 0.1/0.5 mg/kg with TGI (%) of 95%, p<0.001 (FIG. 7). Meanwhile, at the doses of 0.02/0.1 mg/kg and 0.1/0.5 mg/kg of the bispecific antibody CD3ExBCMA, there were no animal deaths and no obvious drug toxicity in each treatment group, and the animals were well tolerated during treatment (FIG. 8).

Example 12: Antitumor Activity of Bispecific Antibody in hCD34+ Humanized Mice Model Twenty female hCD34+ humanized mice aged 20-24 weeks (purchased from Pengli Biomedical Technology (Shanghai) Co., Ltd) were selected. 100 μL of $1 \times 10^7$ RPMI8226 cells and 100 μL of MATRIGEL® matrix were mixed well, and then the mixture was inoculated into the right side of the back of the mice via subcutaneous injection. The mice were anesthetized with 3-4% isoflurane before inoculation. When the average tumor volume reached to about 50-80 mm³, 16 tumor-bearing mice were randomly divided into 2 groups according to the ratio of hCD34+ in the peripheral blood and the tumor volumes, with 8 mice in each group. The day of grouping and administration was defined as day 0. The test groups can be divided into 2 groups: administration group, the bispecific antibody CD3ExBCMA, 0.01 mg/kg and negative control group, IgG1m3, 0.01 mg/kg. Each group consists of eight mice. The bispecific antibody was administered via tail vein injection, with a total of 4 times at the frequency of once a week. The therapeutic effects were evaluated according to the relative tumor growth inhibition value (TGI), and the safety was evaluated according to the body weight change and death of animals.

Figure 9:
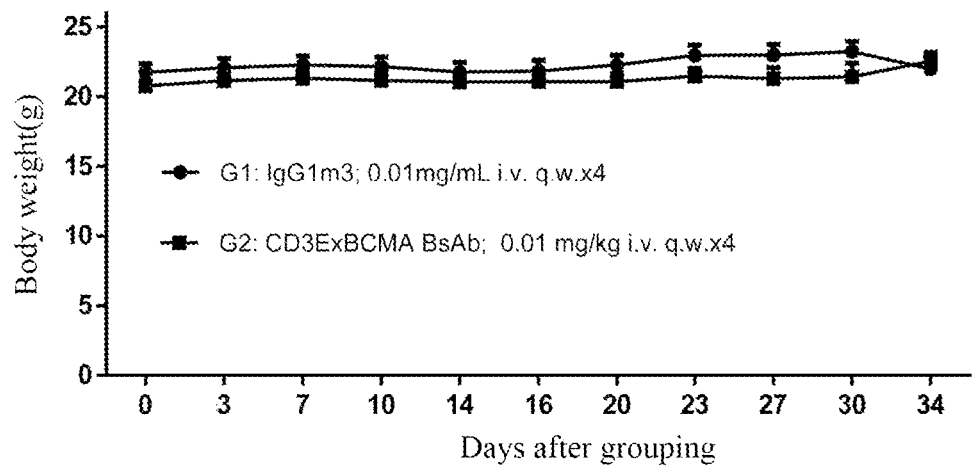
FIG. 9 shows the changes in body weight of a hCD34+ humanized mouse model with RPMI-8226 human-derived myeloma treated with the bispecific antibody CD3ExBCMA.
Figure 10:
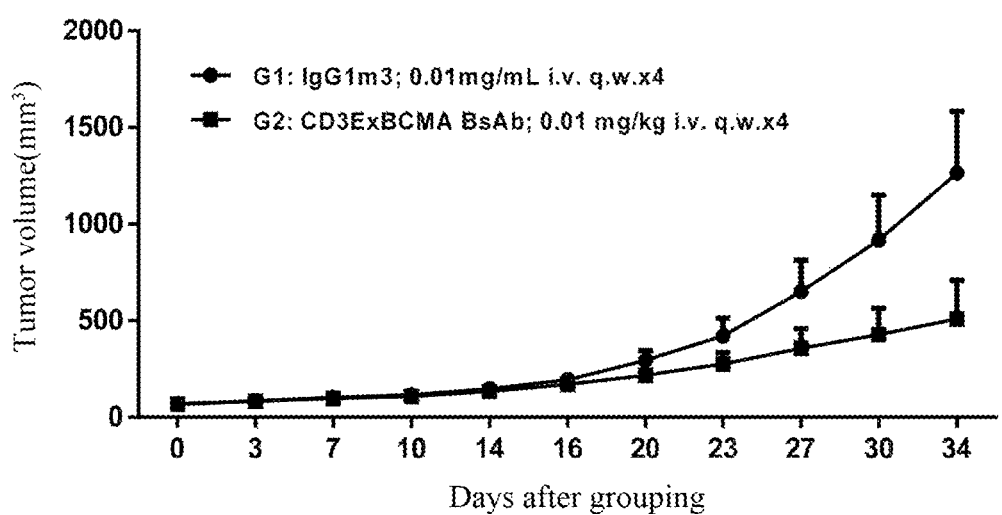
FIG. 10 shows the changes in tumor volume of a hCD34+ humanized mouse model with RPMI-8226 human-derived myeloma treated with the bispecific antibody CD3ExBCMA.

During the experiment, the animals were generally in good mental states. At the end of the in vivo experiment (day 34), there was no significant difference in body weight (P>0.05) in the administration group (group G2) compared with the negative control group (IgG1m3, i.v., 0.01 mg/kg, group G1). The trend of body weight change at each time point in each group was shown in FIG. 9. The bispecific antibody CD3ExBCMA significantly inhibited tumor growth at a dose of 0.01 mg/kg with TGI (%) of 61.17%. Tumor growth was shown in FIG. 10.

Although the present application has been described in detail with reference to the general description and specific embodiments, it will be apparent to those skilled in the art that modifications or improvements can be made to the present invention on the basis of the present application. Accordingly, all these modifications or improvements made without departing from the spirit of the present application will fall within the scope of the invention as claimed.

What is claimed is:

1. A bispecific antibody comprising an antigen-binding portion against human CD3 epsilon (CD3E) and an antigen-binding portion against human B-cell maturation antigen (BCMA), wherein the antigen-binding portion against human CD3E comprises:
   HCDR1 as set forth in SEQ ID NO:1,
   HCDR2 as set forth in SEQ ID NO:2,
   HCDR3 as set forth in SEQ ID NO:3,
   LCDR1 as set forth in SEQ ID NO:4,
   LCDR2 as set forth in SEQ ID NO:5, and
   LCDR3 as set forth in SEQ ID NO:6;
and the antigen-binding portion against human BCMA comprises:
   HCDR1 as set forth in SEQ ID NO:7,
   HCDR2 as set forth in SEQ ID NO:8,
   HCDR3 as set forth in SEQ ID NO:9,
   LCDR1 as set forth in SEQ ID NO:4,
   LCDR2 as set forth in SEQ ID NO:5, and
   LCDR3 as set forth in SEQ ID NO:6;
wherein HCDRs and LCDRs are defined according to Kabat.

2. The bispecific antibody of claim 1, wherein the antigen-binding portion against human CD3E and the antigen-binding portion against human BCMA comprise the same light chain variable region.

3. The bispecific antibody of claim 2, wherein the antigen-binding portion against human CD3E and the antigen-binding portion against human BCMA comprise the same light chain.

4. The bispecific antibody of claim 1, wherein the bispecific antibody is an IgG1 antibody comprising two heavy chain constant regions having the same hinge region, and the amino acid sequence of the hinge region is shown in SEQ ID NO:15.

5. The bispecific antibody of claim 1, wherein the bispecific antibody is an IgG1 antibody comprising a first heavy chain constant region and a second heavy chain constant region, wherein
   the first heavy chain constant region comprises a C at amino acid position 354 and a W at amino acid position 366, and the second heavy chain constant region comprises a C at amino acid position 349, an S at amino acid position 366, an A at amino acid position 368, and a V at amino acid position 407;
   the amino acid position of the antibody constant region is determined according to EU numbering.

6. The bispecific antibody of claim 1, wherein the bispecific antibody is an IgG1 antibody comprising a first heavy chain constant region and a second heavy chain constant region, wherein the first and/or second heavy chain constant regions comprise an F at amino acid position 234, an E at amino acid position 235, and an S at amino acid position 331;
   the amino acid position of the antibody constant region is determined according to EU numbering.

7. The bispecific antibody of claim 1, wherein the antigen-binding portion against human CD3E comprises a heavy chain variable region as set forth in SEQ ID NO:12 and a light chain variable region as set forth in SEQ ID NO:14.

8. The bispecific antibody of claim 1, wherein the antigen-binding portion against human BCMA comprises a heavy chain variable region as set forth in SEQ ID NO:10 and a light chain variable region as set forth in SEQ ID NO:14.

9. The bispecific antibody of claim 1, wherein the antigen-binding portion against human CD3E comprises a single chain antibody (scFv) or a Fab fragment.

10. The bispecific antibody of claim 1, wherein the antigen-binding portion against human BCMA comprises a single chain antibody (scFv) or a Fab fragment.

11. The bispecific antibody of claim 1, wherein the antigen-binding portion against human CD3E comprises a Fab fragment and the antigen-binding portion against human BCMA comprises a Fab fragment; or
   the antigen-binding portion against human CD3E comprises a Fab fragment, and the antigen-binding portion against human BCMA comprises a single chain antibody (scFv); or
   the antigen-binding portion against human CD3E comprises a single chain antibody (scFv), and the antigen-binding portion against human BCMA comprises a Fab fragment; or
   the antigen-binding portion against human CD3E comprises a single chain antibody (scFv), and the antigen-binding portion against human BCMA comprises a single chain antibody (scFv).

12. The bispecific antibody of claim 1, wherein the antibody has a first arm and a second arm, wherein the first arm comprises an antigen-binding portion against human CD3E and the second arm comprises an antigen-binding portion against human BCMA:
   the first arm comprises the amino acid sequence of the heavy chain variable region as set forth in SEQ ID NO:12, the amino acid sequence of the heavy chain constant region as set forth in SEQ ID NO:19, the amino acid sequence of the light chain variable region as set forth in SEQ ID NO:14, and the amino acid sequence of the light chain constant region as set forth in SEQ ID NO:20;
   the second arm comprises the amino acid sequence of the heavy chain variable region as set forth in SEQ ID NO:10, the amino acid sequence of the heavy chain constant region as set forth in SEQ ID NO:18, the amino acid sequence of the light chain variable region as set forth in SEQ ID NO:14, and the amino acid sequence of the light chain constant region as set forth in SEQ ID NO:20.

13. A pharmaceutical composition comprising the bispecific antibody of claim 1.

* * * * *

SEQUENCE LISTING

<160> NUMBER OF SEQ ID NOS: 36

<210> SEQ ID NO 1
<211> LENGTH: 5
<212> TYPE: PRT
<213> ORGANISM: Artificial Sequence
<220> FEATURE:
<223> OTHER INFORMATION: synthetic polypeptide

<400> SEQUENCE: 1

Gly Tyr Gly Met His
1               5

<210> SEQ ID NO 2
<211> LENGTH: 17
<212> TYPE: PRT
<213> ORGANISM: Artificial Sequence
<220> FEATURE:
<223> OTHER INFORMATION: synthetic polypeptide

<400> SEQUENCE: 2

Val Ile Trp Phe Asp Gly Ser Arg Lys Tyr Tyr Val Asp Ser Val Lys
1               5                   10                  15

Gly

```
<210> SEQ ID NO 3
<211> LENGTH: 9
<212> TYPE: PRT
<213> ORGANISM: Artificial Sequence
<220> FEATURE:
<223> OTHER INFORMATION: synthetic polypeptide

<400> SEQUENCE: 3

Gln Met Gly Tyr Trp His Phe Gly Leu
1               5

<210> SEQ ID NO 4
<211> LENGTH: 11
<212> TYPE: PRT
<213> ORGANISM: Artificial Sequence
<220> FEATURE:
<223> OTHER INFORMATION: synthetic polypeptide

<400> SEQUENCE: 4

Arg Ala Ser Gln Ser Ile Ser Asn Tyr Leu Thr
1               5                   10

<210> SEQ ID NO 5
<211> LENGTH: 7
<212> TYPE: PRT
<213> ORGANISM: Artificial Sequence
<220> FEATURE:
<223> OTHER INFORMATION: synthetic polypeptide

<400> SEQUENCE: 5

Glu Ala Ser Ser Arg Pro Ser
1               5

<210> SEQ ID NO 6
<211> LENGTH: 9
<212> TYPE: PRT
<213> ORGANISM: Artificial Sequence
<220> FEATURE:
<223> OTHER INFORMATION: synthetic polypeptide

<400> SEQUENCE: 6

Gln Gln Trp Ser Arg Leu Pro Val Thr
1               5

<210> SEQ ID NO 7
<211> LENGTH: 5
<212> TYPE: PRT
<213> ORGANISM: Artificial Sequence
<220> FEATURE:
<223> OTHER INFORMATION: synthetic polypeptide

<400> SEQUENCE: 7

Asn Tyr Trp Met His
1               5

<210> SEQ ID NO 8
<211> LENGTH: 17
<212> TYPE: PRT
<213> ORGANISM: Artificial Sequence
<220> FEATURE:
<223> OTHER INFORMATION: synthetic polypeptide

<400> SEQUENCE: 8

Ala Thr Tyr Arg Gly His Ser Asp Thr Tyr Tyr Asn Gln Lys Phe Lys
1               5                   10                  15

Gly
```

```
<210> SEQ ID NO 9
<211> LENGTH: 12
<212> TYPE: PRT
<213> ORGANISM: Artificial Sequence
<220> FEATURE:
<223> OTHER INFORMATION: synthetic polypeptide

<400> SEQUENCE: 9

Gly Ala Val Tyr Ala Gly Tyr Asp Val Leu Asp Tyr
1               5                   10

<210> SEQ ID NO 10
<211> LENGTH: 121
<212> TYPE: PRT
<213> ORGANISM: Artificial Sequence
<220> FEATURE:
<223> OTHER INFORMATION: synthetic polypeptide

<400> SEQUENCE: 10

Gln Val Gln Leu Val Gln Ser Gly Ala Glu Val Lys Lys Pro Gly Ser
1               5                   10                  15

Ser Val Lys Val Ser Cys Lys Ala Ser Gly Tyr Thr Phe Thr Asn Tyr
            20                  25                  30

Trp Met His Trp Val Arg Gln Ala Pro Gly Gln Gly Leu Glu Trp Met
        35                  40                  45

Gly Ala Thr Tyr Arg Gly His Ser Asp Thr Tyr Tyr Asn Gln Lys Phe
    50                  55                  60

Lys Gly Arg Val Thr Ile Thr Ala Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Thr Arg Gly Ala Val Tyr Ala Gly Tyr Asp Val Leu Asp Tyr Trp Gly
            100                 105                 110

Gln Gly Thr Thr Val Thr Val Ser Ser
        115                 120

<210> SEQ ID NO 11
<211> LENGTH: 121
<212> TYPE: PRT
<213> ORGANISM: Artificial Sequence
<220> FEATURE:
<223> OTHER INFORMATION: synthetic polypeptide

<400> SEQUENCE: 11

Gln Val Gln Leu Val Gln Ser Gly Ala Glu Val Lys Lys Pro Gly Ser
1               5                   10                  15

Ser Val Lys Val Ser Cys Lys Ala Ser Gly Tyr Thr Phe Thr Asn Tyr
            20                  25                  30

Trp Met His Trp Val Arg Gln Ala Pro Gly Gln Gly Leu Glu Trp Met
        35                  40                  45

Gly Ala Thr Tyr Arg Gly His Ser Asp Thr Tyr Tyr Asn Gln Lys Phe
    50                  55                  60

Lys Gly Arg Val Thr Ile Thr Ala Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Thr Arg Gly Ala Ile Tyr Asp Gly Tyr Asp Val Leu Asp Asn Trp Gly
            100                 105                 110

Gln Gly Thr Leu Val Thr Val Ser Ser
```

<210> SEQ ID NO 12
<211> LENGTH: 118
<212> TYPE: PRT
<213> ORGANISM: Artificial Sequence
<220> FEATURE:
<223> OTHER INFORMATION: synthetic polypeptide

<400> SEQUENCE: 12

```
Gln Val Gln Leu Val Glu Ser Gly Gly Val Val Gln Pro Gly Arg
1               5                   10                  15

Ser Leu Arg Leu Ser Cys Ala Ala Ser Gly Phe Lys Phe Ser Gly Tyr
            20                  25                  30

Gly Met His Trp Val Arg Gln Ala Pro Gly Lys Gly Leu Glu Trp Val
        35                  40                  45

Ala Val Ile Trp Phe Asp Gly Ser Arg Lys Tyr Tyr Val Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gln Met Gly Tyr Trp His Phe Gly Leu Trp Gly Arg Gly Thr
            100                 105                 110

Leu Val Thr Val Ser Ser
            115
```

<210> SEQ ID NO 13
<211> LENGTH: 107
<212> TYPE: PRT
<213> ORGANISM: Artificial Sequence
<220> FEATURE:
<223> OTHER INFORMATION: synthetic polypeptide

<400> SEQUENCE: 13

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Gly Ile Asn Asn Ser
            20                  25                  30

Leu Thr Trp Tyr Gln Gln Lys Pro Gly Lys Ala Pro Lys Leu Leu Ile
        35                  40                  45

Tyr Gly Ala Ser Asn Arg Glu Thr Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Trp Leu Lys Leu Pro Pro
                85                  90                  95

Thr Phe Gly Gln Gly Thr Lys Val Glu Ile Lys
            100                 105
```

<210> SEQ ID NO 14
<211> LENGTH: 107
<212> TYPE: PRT
<213> ORGANISM: Artificial Sequence
<220> FEATURE:
<223> OTHER INFORMATION: synthetic polypeptide

<400> SEQUENCE: 14

```
Asp Ile Gln Met Thr Gln Ser Pro Ser Ser Leu Ser Ala Ser Val Gly
1               5                   10                  15
```

Asp Arg Val Thr Ile Thr Cys Arg Ala Ser Gln Ser Ile Ser Asn Tyr
            20                  25                  30

Leu Thr Trp Tyr Gln Gln Lys Pro Gly Lys Ala Pro Lys Leu Leu Ile
        35                  40                  45

Tyr Glu Ala Ser Ser Arg Pro Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Trp Ser Arg Leu Pro Val
                85                  90                  95

Thr Phe Gly Gln Gly Thr Lys Val Glu Ile Lys
            100                 105

<210> SEQ ID NO 15
<211> LENGTH: 12
<212> TYPE: PRT
<213> ORGANISM: Artificial Sequence
<220> FEATURE:
<223> OTHER INFORMATION: synthetic polypeptide

<400> SEQUENCE: 15

Glu Arg Lys Ser Cys Val Glu Cys Pro Pro Cys Pro
1               5                   10

<210> SEQ ID NO 16
<211> LENGTH: 107
<212> TYPE: PRT
<213> ORGANISM: Artificial Sequence
<220> FEATURE:
<223> OTHER INFORMATION: synthetic polypeptide

<400> SEQUENCE: 16

Asp Ile Gln Met Thr Gln Ser Pro Ser Ser Leu Ser Ala Ser Val Gly
1               5                   10                  15

Asp Arg Val Thr Ile Thr Cys Ser Ala Ser Gln Asp Ile Ser Asn Tyr
            20                  25                  30

Leu Asn Trp Tyr Gln Gln Lys Pro Gly Lys Ala Pro Lys Leu Leu Ile
        35                  40                  45

Tyr Tyr Thr Ser Asn Leu His Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Arg Lys Leu Pro Trp
                85                  90                  95

Thr Phe Gly Gln Gly Thr Lys Leu Glu Ile Lys
            100                 105

<210> SEQ ID NO 17
<211> LENGTH: 330
<212> TYPE: PRT
<213> ORGANISM: Artificial Sequence
<220> FEATURE:
<223> OTHER INFORMATION: synthetic polypeptide

<400> SEQUENCE: 17

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
 50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
            115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
            195                 200                 205

Lys Ala Leu Pro Ala Pro Ile Glu Lys Thr Ile Ser Lys Ala Lys Gly
            210                 215                 220

Gln Pro Arg Glu Pro Gln Val Tyr Thr Leu Pro Pro Cys Arg Glu Glu
225                 230                 235                 240

Met Thr Lys Asn Gln Val Ser Leu Trp Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

```
<210> SEQ ID NO 18
<211> LENGTH: 330
<212> TYPE: PRT
<213> ORGANISM: Artificial Sequence
<220> FEATURE:
<223> OTHER INFORMATION: synthetic polypeptide

<400> SEQUENCE: 18
```

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
 50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Phe Glu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Ser Ile Glu Lys Thr Ile Ser Lys Ala Lys Gly
    210                 215                 220

Gln Pro Arg Glu Pro Gln Val Cys Thr Leu Pro Pro Ser Arg Glu Glu
225                 230                 235                 240

Met Thr Lys Asn Gln Val Ser Leu Ser Cys Ala Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Val Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 19
<211> LENGTH: 330
<212> TYPE: PRT
<213> ORGANISM: Artificial Sequence
<220> FEATURE:
<223> OTHER INFORMATION: synthetic polypeptide

<400> SEQUENCE: 19

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

```
Arg Val Glu Pro Lys Ser Cys Asp Lys Thr His Thr Cys Pro Pro Cys
            100                 105                 110

Pro Ala Pro Glu Phe Glu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Ser Ile Glu Lys Thr Ile Ser Lys Ala Lys Gly
    210                 215                 220

Gln Pro Arg Glu Pro Gln Val Tyr Thr Leu Pro Pro Cys Arg Glu Glu
225                 230                 235                 240

Met Thr Lys Asn Gln Val Ser Leu Trp Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 20
<211> LENGTH: 107
<212> TYPE: PRT
<213> ORGANISM: Homo sapiens

<400> SEQUENCE: 20

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 21
<211> LENGTH: 106
<212> TYPE: PRT
<213> ORGANISM: Homo sapiens
```

<400> SEQUENCE: 21

Gly Gln Pro Lys Ala Ala Pro Ser Val Thr Leu Phe Pro Pro Ser Ser
1               5                   10                  15

Glu Glu Leu Gln Ala Asn Lys Ala Thr Leu Val Cys Leu Ile Ser Asp
            20                  25                  30

Phe Tyr Pro Gly Ala Val Thr Val Ala Trp Lys Ala Asp Ser Ser Pro
        35                  40                  45

Val Lys Ala Gly Val Glu Thr Thr Pro Ser Lys Gln Ser Asn Asn
50                  55                  60

Lys Tyr Ala Ala Ser Ser Tyr Leu Ser Leu Thr Pro Glu Gln Trp Lys
65                  70                  75                  80

Ser His Arg Ser Tyr Ser Cys Gln Val Thr His Glu Gly Ser Thr Val
                85                  90                  95

Glu Lys Thr Val Ala Pro Thr Glu Cys Ser
            100                 105

<210> SEQ ID NO 22
<211> LENGTH: 105
<212> TYPE: PRT
<213> ORGANISM: Homo sapiens

<400> SEQUENCE: 22

Gln Asp Gly Asn Glu Glu Met Gly Gly Ile Thr Gln Thr Pro Tyr Lys
1               5                   10                  15

Val Ser Ile Ser Gly Thr Thr Val Ile Leu Thr Cys Pro Gln Tyr Pro
            20                  25                  30

Gly Ser Glu Ile Leu Trp Gln His Asn Asp Lys Asn Ile Gly Gly Asp
        35                  40                  45

Glu Asp Asp Lys Asn Ile Gly Ser Asp Glu Asp His Leu Ser Leu Lys
50                  55                  60

Glu Phe Ser Glu Leu Glu Gln Ser Gly Tyr Tyr Val Cys Tyr Pro Arg
65                  70                  75                  80

Gly Ser Lys Pro Glu Asp Ala Asn Phe Tyr Leu Tyr Leu Arg Ala Arg
                85                  90                  95

Val Cys Glu Asn Cys Met Glu Met Asp
            100                 105

<210> SEQ ID NO 23
<211> LENGTH: 84
<212> TYPE: PRT
<213> ORGANISM: Homo sapiens

<400> SEQUENCE: 23

Phe Lys Ile Pro Ile Glu Glu Leu Glu Asp Arg Val Phe Val Asn Cys
1               5                   10                  15

Asn Thr Ser Ile Thr Trp Val Glu Gly Thr Val Gly Thr Leu Leu Ser
            20                  25                  30

Asp Ile Thr Arg Leu Asp Leu Gly Lys Arg Ile Leu Asp Pro Arg Gly
        35                  40                  45

Ile Tyr Arg Cys Asn Gly Thr Asp Ile Tyr Lys Asp Lys Glu Ser Thr
50                  55                  60

Val Gln Val His Tyr Arg Met Cys Gln Ser Cys Val Glu Leu Asp Pro
65                  70                  75                  80

Ala Thr Val Ala

-continued

```
<210> SEQ ID NO 24
<211> LENGTH: 96
<212> TYPE: PRT
<213> ORGANISM: Macaca fascicularis

<400> SEQUENCE: 24

Gln Asp Gly Asn Glu Glu Met Gly Ser Ile Thr Gln Thr Pro Tyr Gln
1               5                   10                  15

Val Ser Ile Ser Gly Thr Thr Val Ile Leu Thr Cys Ser Gln His Leu
            20                  25                  30

Gly Ser Glu Ala Gln Trp Gln His Asn Gly Lys Asn Lys Glu Asp Ser
        35                  40                  45

Gly Asp Arg Leu Phe Leu Pro Glu Phe Ser Glu Met Glu Gln Ser Gly
    50                  55                  60

Tyr Tyr Val Cys Tyr Pro Arg Gly Ser Asn Pro Glu Asp Ala Ser His
65                  70                  75                  80

His Leu Tyr Leu Lys Ala Arg Val Cys Glu Asn Cys Met Glu Met Asp
                85                  90                  95

<210> SEQ ID NO 25
<211> LENGTH: 84
<212> TYPE: PRT
<213> ORGANISM: Macaca fascicularis

<400> SEQUENCE: 25

Phe Lys Ile Pro Val Glu Glu Leu Glu Asp Arg Val Phe Val Lys Cys
1               5                   10                  15

Asn Thr Ser Val Thr Trp Val Glu Gly Thr Val Gly Thr Leu Leu Thr
            20                  25                  30

Asn Asn Thr Arg Leu Asp Leu Gly Lys Arg Ile Leu Asp Pro Arg Gly
        35                  40                  45

Ile Tyr Arg Cys Asn Gly Thr Asp Ile Tyr Lys Asp Lys Glu Ser Ala
    50                  55                  60

Val Gln Val His Tyr Arg Met Cys Gln Asn Cys Val Glu Leu Asp Pro
65                  70                  75                  80

Ala Thr Leu Ala

<210> SEQ ID NO 26
<211> LENGTH: 87
<212> TYPE: PRT
<213> ORGANISM: Mus musculus

<400> SEQUENCE: 26

Asp Asp Ala Glu Asn Ile Glu Tyr Lys Val Ser Ile Ser Gly Thr Ser
1               5                   10                  15

Val Glu Leu Thr Cys Pro Leu Asp Ser Asp Glu Asn Leu Lys Trp Glu
            20                  25                  30

Lys Asn Gly Gln Glu Leu Pro Gln Lys His Asp Lys His Leu Val Leu
        35                  40                  45

Gln Asp Phe Ser Glu Val Glu Asp Ser Gly Tyr Tyr Val Cys Tyr Thr
    50                  55                  60

Pro Ala Ser Asn Lys Asn Thr Tyr Leu Tyr Leu Lys Ala Arg Val Cys
65                  70                  75                  80

Glu Tyr Cys Val Glu Val Asp
                85

<210> SEQ ID NO 27
<211> LENGTH: 84
```

```
<212> TYPE: PRT
<213> ORGANISM: Mus musculus

<400> SEQUENCE: 27

Phe Lys Ile Gln Val Thr Glu Tyr Glu Asp Lys Val Phe Val Thr Cys
1               5                   10                  15

Asn Thr Ser Val Met His Leu Asp Gly Thr Val Glu Gly Trp Phe Ala
                20                  25                  30

Lys Asn Lys Thr Leu Asn Leu Gly Lys Gly Val Leu Asp Pro Arg Gly
            35                  40                  45

Ile Tyr Leu Cys Asn Gly Thr Glu Gln Leu Ala Lys Val Val Ser Ser
    50                  55                  60

Val Gln Val His Tyr Arg Met Cys Gln Asn Cys Val Glu Leu Asp Ser
65                  70                  75                  80

Gly Thr Met Ala

<210> SEQ ID NO 28
<211> LENGTH: 54
<212> TYPE: PRT
<213> ORGANISM: Homo sapiens

<400> SEQUENCE: 28

Met Leu Gln Met Ala Gly Gln Cys Ser Gln Asn Glu Tyr Phe Asp Ser
1               5                   10                  15

Leu Leu His Ala Cys Ile Pro Cys Gln Leu Arg Cys Ser Ser Asn Thr
                20                  25                  30

Pro Pro Leu Thr Cys Gln Arg Tyr Cys Asn Ala Ser Val Thr Asn Ser
            35                  40                  45

Val Lys Gly Thr Asn Ala
    50

<210> SEQ ID NO 29
<211> LENGTH: 52
<212> TYPE: PRT
<213> ORGANISM: Macaca fascicularis

<400> SEQUENCE: 29

Met Leu Gln Met Ala Arg Gln Cys Ser Gln Asn Glu Tyr Phe Asp Ser
1               5                   10                  15

Leu Leu His Asp Cys Lys Pro Cys Gln Leu Arg Cys Ser Ser Thr Pro
                20                  25                  30

Pro Leu Thr Cys Gln Arg Tyr Cys Asn Ala Ser Met Thr Asn Ser Val
            35                  40                  45

Lys Gly Met Asn
    50

<210> SEQ ID NO 30
<211> LENGTH: 49
<212> TYPE: PRT
<213> ORGANISM: Mus musculus

<400> SEQUENCE: 30

Met Ala Gln Gln Cys Phe His Ser Glu Tyr Phe Asp Ser Leu Leu His
1               5                   10                  15

Ala Cys Lys Pro Cys His Leu Arg Cys Ser Asn Pro Ala Thr Cys
                20                  25                  30

Gln Pro Tyr Cys Asp Pro Ser Val Thr Ser Ser Val Lys Gly Thr Tyr
            35                  40                  45
```

Thr

<210> SEQ ID NO 31
<211> LENGTH: 6
<212> TYPE: PRT
<213> ORGANISM: Artificial Sequence
<220> FEATURE:
<223> OTHER INFORMATION: synthetic polypeptide

<400> SEQUENCE: 31

His His His His His His
1               5

<210> SEQ ID NO 32
<211> LENGTH: 232
<212> TYPE: PRT
<213> ORGANISM: Mus musculus

<400> SEQUENCE: 32

Pro Arg Gly Pro Thr Ile Lys Pro Cys Pro Pro Cys Lys Cys Pro Ala
1               5                   10                  15

Pro Asn Leu Leu Gly Gly Pro Ser Val Phe Ile Phe Pro Pro Lys Ile
            20                  25                  30

Lys Asp Val Leu Met Ile Ser Leu Ser Pro Ile Val Thr Cys Val Val
        35                  40                  45

Val Asp Val Ser Glu Asp Asp Pro Asp Val Gln Ile Ser Trp Phe Val
    50                  55                  60

Asn Asn Val Glu Val His Thr Ala Gln Thr Gln Thr His Arg Glu Asp
65                  70                  75                  80

Tyr Asn Ser Thr Leu Arg Val Val Ser Ala Leu Pro Ile Gln His Gln
                85                  90                  95

Asp Trp Met Ser Gly Lys Glu Phe Lys Cys Lys Val Asn Asn Lys Asp
            100                 105                 110

Leu Pro Ala Pro Ile Glu Arg Thr Ile Ser Lys Pro Lys Gly Ser Val
        115                 120                 125

Arg Ala Pro Gln Val Tyr Val Leu Pro Pro Pro Glu Glu Glu Met Thr
    130                 135                 140

Lys Lys Gln Val Thr Leu Thr Cys Met Val Thr Asp Phe Met Pro Glu
145                 150                 155                 160

Asp Ile Tyr Val Glu Trp Thr Asn Asn Gly Lys Thr Glu Leu Asn Tyr
                165                 170                 175

Lys Asn Thr Glu Pro Val Leu Asp Ser Asp Gly Ser Tyr Phe Met Tyr
            180                 185                 190

Ser Lys Leu Arg Val Glu Lys Lys Asn Trp Val Glu Arg Asn Ser Tyr
        195                 200                 205

Ser Cys Ser Val Val His Glu Gly Leu His Asn His Thr Thr Lys
    210                 215                 220

Ser Phe Ser Arg Thr Pro Gly Lys
225                 230

<210> SEQ ID NO 33
<211> LENGTH: 232
<212> TYPE: PRT
<213> ORGANISM: Artificial Sequence
<220> FEATURE:
<223> OTHER INFORMATION: synthetic polypeptide

<400> SEQUENCE: 33

Glu Pro Lys Ser Ser Asp Lys Thr His Thr Cys Pro Pro Cys Pro Ala

```
1               5                   10                  15
Pro Glu Leu Leu Gly Gly Pro Ser Val Phe Leu Phe Pro Pro Lys Pro
                20                  25                  30

Lys Asp Thr Leu Met Ile Ser Arg Thr Pro Glu Val Thr Cys Val Val
                35                  40                  45

Val Asp Val Ser His Glu Asp Pro Glu Val Lys Phe Asn Trp Tyr Val
        50                  55                  60

Asp Gly Val Glu Val His Asn Ala Lys Thr Lys Pro Arg Glu Glu Gln
65                  70                  75                  80

Tyr Asn Ser Thr Tyr Arg Val Val Ser Val Leu Thr Val Leu His Gln
                85                  90                  95

Asp Trp Leu Asn Gly Lys Glu Tyr Lys Cys Lys Val Ser Asn Lys Ala
                100                 105                 110

Leu Pro Ala Pro Ile Glu Lys Thr Ile Ser Lys Ala Lys Gly Gln Pro
                115                 120                 125

Arg Glu Pro Gln Val Tyr Thr Leu Pro Pro Cys Arg Glu Glu Met Thr
130                 135                 140

Lys Asn Gln Val Ser Leu Trp Cys Leu Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Tyr
                180                 185                 190

Ser Lys Leu Thr Val Asp Lys Ser Arg Trp Gln Gln Gly Asn Val Phe
                195                 200                 205

Ser Cys Ser Val Met His Glu Ala Leu His Asn His Tyr Thr Gln Lys
                210                 215                 220

Ser Leu Ser Leu Ser Pro Gly Lys
225                 230

<210> SEQ ID NO 34
<211> LENGTH: 232
<212> TYPE: PRT
<213> ORGANISM: Artificial Sequence
<220> FEATURE:
<223> OTHER INFORMATION: synthetic polypeptide

<400> SEQUENCE: 34

Glu Pro Lys Ser Ser Asp Lys Thr His Thr Cys Pro Pro Cys Pro Ala
1               5                   10                  15

Pro Glu Leu Leu Gly Gly Pro Ser Val Phe Leu Phe Pro Pro Lys Pro
                20                  25                  30

Lys Asp Thr Leu Met Ile Ser Arg Thr Pro Glu Val Thr Cys Val Val
                35                  40                  45

Val Asp Val Ser His Glu Asp Pro Glu Val Lys Phe Asn Trp Tyr Val
        50                  55                  60

Asp Gly Val Glu Val His Asn Ala Lys Thr Lys Pro Arg Glu Glu Gln
65                  70                  75                  80

Tyr Asn Ser Thr Tyr Arg Val Val Ser Val Leu Thr Val Leu His Gln
                85                  90                  95

Asp Trp Leu Asn Gly Lys Glu Tyr Lys Cys Lys Val Ser Asn Lys Ala
                100                 105                 110

Leu Pro Ala Pro Ile Glu Lys Thr Ile Ser Lys Ala Lys Gly Gln Pro
                115                 120                 125

Arg Glu Pro Gln Val Cys Thr Leu Pro Pro Ser Arg Glu Glu Met Thr
```

```
            130                 135                 140
Lys Asn Gln Val Ser Leu Ser Cys Ala Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Val
            180                 185                 190

Ser Lys Leu Thr Val Asp Lys Ser Arg Trp Gln Gln Gly Asn Val Phe
        195                 200                 205

Ser Cys Ser Val Met His Glu Ala Leu His Asn His Tyr Thr Gln Lys
    210                 215                 220

Ser Leu Ser Leu Ser Pro Gly Lys
225                 230

<210> SEQ ID NO 35
<211> LENGTH: 330
<212> TYPE: PRT
<213> ORGANISM: Homo sapiens

<400> SEQUENCE: 35

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270
```

```
Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
            325                 330

<210> SEQ ID NO 36
<211> LENGTH: 330
<212> TYPE: PRT
<213> ORGANISM: Artificial Sequence
<220> FEATURE:
<223> OTHER INFORMATION: synthetic polypeptide

<400> SEQUENCE: 36

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Cys Thr Leu Pro Pro Ser Arg Glu Glu
225                 230                 235                 240

Met Thr Lys Asn Gln Val Ser Leu Ser Cys Ala Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Val Ser Lys Leu Thr Val Asp Lys Ser Arg Trp Gln Gln Gly Asn
    290                 295                 300
```

```
Val Phe Ser Cys Ser Val Met His Glu Ala Leu His Asn His Tyr Thr
305                 310                 315                 320

Gln Lys Ser Leu Ser Leu Ser Pro Gly Lys
                325             330
```